United States Patent
Zhang

(10) Patent No.: US 11,665,037 B2
(45) Date of Patent: *May 30, 2023

(54) METHOD AND DEVICE FOR WIRELESS COMMUNICATION

(71) Applicant: Xiaobo Zhang, Shanghai (CN)

(72) Inventor: Xiaobo Zhang, Shanghai (CN)

(73) Assignee: SHANGHAI LANGBO COMMUNICATION TECHNOLOGY COMPANY LIMIIED, Shanghai (CN)

( * ) Notice: Subject to any disclaimer, the term of this patent is extended or adjusted under 35 U.S.C. 154(b) by 153 days.

This patent is subject to a terminal disclaimer.

(21) Appl. No.: 17/105,636

(22) Filed: Nov. 27, 2020

(65) Prior Publication Data

US 2021/0099964 A1 Apr. 1, 2021

Related U.S. Application Data

(63) Continuation of application No. 16/421,488, filed on May 24, 2019, now Pat. No. 10,925,020, which is a
(Continued)

(30) Foreign Application Priority Data

Nov. 27, 2016 (CN) .......................... 201611057963.0

(51) Int. Cl.
*H04L 27/26* (2006.01)
*H04W 56/00* (2009.01)
(Continued)

(52) U.S. Cl.
CPC .......... *H04L 27/26025* (2021.01); *H04L 5/00* (2013.01); *H04L 27/00* (2013.01);
(Continued)

(58) Field of Classification Search
CPC ... H04W 56/001; H04W 56/00; H04W 72/04; H04W 72/0453; H04W 88/02;
(Continued)

(56) References Cited

U.S. PATENT DOCUMENTS 9,609,585 B1* 3/2017 Markovic ............. H04W 48/16
10,925,020 B2* 2/2021 Zhang ................. H04W 56/001
(Continued)

FOREIGN PATENT DOCUMENTS

CN 103124246 A 5/2013
CN 103460610 A 12/2013
(Continued)

OTHER PUBLICATIONS

Nokia Networks: "On the channel raster design for NB-IoT",3GPP Draft; RI-160172, 3rd Generation Partnership Project (3GPP), Mobile Competence Centre ; 650, Route Des Lucioles ; F-06921 Sophia-Antipolis Cedex France vol. RAN WG1, No. Budapest, HU; 20160U8 • Jan. 20, 2016 Jan. 17, 2016 (Jan. 17, 2016).
(Continued)

*Primary Examiner* — Steven H Nguyen

(57) ABSTRACT

A method and a device for wireless communication are disclosed. The base station transmits a first radio signal on first frequency-domain resources in a first time window, and then transmits a first signaling. The center frequency of the first frequency-domain resources is a first frequency; the first frequency-domain resources comprise X subcarrier(s); a center frequency of a first carrier to which the first frequency-domain resources belong is a second frequency; an interval between the first frequency and the second frequency in frequency domain is related to a subcarrier spacing of the X subcarrier(s); the first signaling is used to determine a feature ID of a transmitter of the first radio signal in the first carrier. The present disclosure can independently configure the center frequency of a carrier and the center frequency of a user equipment to avoid resource waste and reduce synchronization complexity.

20 Claims, 10 Drawing Sheets

Related U.S. Application Data continuation of application No. PCT/CN2017/108340, filed on Oct. 30, 2017.

(51) Int. Cl.
   *H04W 72/0453* (2023.01)
   *H04W 72/04* (2023.01)
   *H04L 27/00* (2006.01)
   *H04L 5/00* (2006.01)
   *H04W 88/02* (2009.01)
   *H04W 88/08* (2009.01)

(52) U.S. Cl.
   CPC ......... *H04W 56/00* (2013.01); *H04W 56/001* (2013.01); *H04W 72/04* (2013.01); *H04W 72/0453* (2013.01); *H04W 88/02* (2013.01); *H04W 88/08* (2013.01)

(58) Field of Classification Search
   CPC .......... H04W 88/08; H04L 5/00; H04L 27/00; H04L 27/26025; H04L 5/0053; H04L 5/0005; H04L 27/2675; H04L 5/001; H04L 27/0014; H04L 2027/0026; H04J 11/0069
   See application file for complete search history.

(56) References Cited

U.S. PATENT DOCUMENTS

| | | | |
|---|---|---|---|
| 2011/0317647 A1* | 12/2011 | Cho | H04L 27/2607 370/329 |
| 2013/0016630 A1 | 1/2013 | Bhushan et al. | |
| 2017/0135052 A1* | 5/2017 | Lei | H04W 56/001 |
| 2017/0245278 A1* | 8/2017 | Xue | H04W 56/001 |

FOREIGN PATENT DOCUMENTS

| | | |
|---|---|---|
| CN | 104704898 A | 6/2015 |
| CN | 105530080 A | 4/2016 |
| CN | 105900472 A | 8/2016 |
| CN | 106063353 A | 10/2016 |
| JP | 4440895 B2 | 3/2010 |
| WO | 2013010014 A1 | 1/2013 |
| WO | 2016070427 | 5/2016 |

OTHER PUBLICATIONS

Motorola Mobility: "Synchronization signal in NR", 3GPP Draft; RI-1609917 NR Synchronization Signal, 3rd Generation Partnership Project (3GPP), Mobile Competence Centre ; 650, Route Des Lucioles ; F-06921 Sophia-Anti Polis Cedex ; France » vol. RAN WG1, No. Lisbon, Portugal; Oct. 10, 2010 • Oct. 14, 2016 Oct. 9, 2016 (Oct. 9, 2016).
SR received in application No. 17873080.0 dated Nov. 8, 2019.
SR received in application No. PCT/CN2017/108340 dated Jan. 8, 2018.
SR received in application No. 201611057963.0 dated Sep. 25, 2019.
3GPP TSG Ran WG1 Meeting #87 Samsung carrier raster and synchronization signal transmission.
汪峰 LTE 中小区搜索的关键过程及其算法研究 《电脑知识与技术》第6卷第7期.
Supplement Search Report received in application No. 201611057963.0 dated Mar. 26, 2020.
First Office Action received in application No. 201611057963.0 dated Oct. 19, 2019.
Second Office Action received in application No. 201611057963.0 dated Apr. 3, 2020.
Notice of Allowance received in application No. 201611057963.0 dated Oct. 9, 2020.

* cited by examiner

METHOD AND DEVICE FOR WIRELESS COMMUNICATION

CROSS-REFERENCE TO RELATED APPLICATION

This application is a continuation of the U.S. application Ser. No. 16/421,488, filed May 24, 2019, which is a continuation of International Application No. PCT/CN2017/108340, filed Oct. 30, 2017, claiming the priority benefit of Chinese Patent Application Serial Number 201611057963.0, filed on Nov. 27, 2016, the full disclosure of which is incorporated herein by reference.

BACKGROUND

Technical Field

The present disclosure relates to a transmission method in a wireless communication system supporting multiple numerologies, and particularly to a method and a device for synchronization signal transmission.

Related Art

The application scenarios of future wireless communication system are increasingly diversified, and different application scenarios impose different performance requirements on the system. In order to meet different performance requirements of various application scenarios, at 3rd Generation Partner Project (3GPP) Radio Access Network (RAN) #72 plenary meeting, it was decided to conduct a study on the new air interface technology (NR, New Radio).

In order to adapt to a variety of different application scenarios flexibly, future wireless communication systems, especially NR, will be able to support multiple numerologies, which refer to a variety of subcarrier spacings, a variety of symbol time lengths, a variety of Cyclic Prefix (CP) lengths and so on. At RAN1 #86bis, a Working Assumption (WA) that supports to adopt frequency division multiplexing (FDM) of multiple numerologies with nested structure was reached. The nested structure requires boundary alignment of physical resource blocks (PRB, Physical Resource Block) of different numerologies in frequency domain. This multiplexing method can avoid resource fragmentation to the largest extent.

SUMMARY

In a wireless communication system, UE needs to detect a base station and synchronize with the base station with respect to both time and frequency before the subsequent operations can be carried out. This kind of signal detection and time and frequency synchronization are all accomplished based on synchronization signals. According to different designs, the synchronization signals can also be used to indicate cell IDs, TRP (Transmission Reception Point) IDs, antenna port IDs, beam IDs, FDD/TDD differentiation, and subframe/radio frame timing, and so on.

In the process of initial cell search in the network, the user equipment needs to perform initial detection of the synchronization signals at all possible frequency points. In LTE, channel raster is predefined to limit the center frequency of a carrier at the network side and to limit the searching frequency points (usually the center frequency of the synchronization signals) by a user equipment during initial synchronization, the center frequency point of the carrier and the center frequency point of the synchronization signals both meet the channel raster of 100 kHz, that is, within the allocated frequency band, the center frequency point of the carrier is the same as the center frequency point of the synchronization signals, and is apart from the lowest boundary of the frequency band by an integer multiple of 100 kHz. However, this raster definition of LTE is not applicable for NR for the following reasons.

NR supports a wider carrier bandwidth and frequency band bandwidth, and if the searching raster of 100 kHz is used, the complexity and delay of the initial synchronization will be greatly increased.

The introduction of multiple numerologies may result in the inability to keep the center frequency of the carrier consistent with the center frequency of synchronization signals.

For UE with different capabilities, especially RF capabilities, not all user equipment need to support the entire carrier bandwidth, nor need to know the central frequency of the carrier. This also makes it possible to support different a carrier center frequency point from the synchronization signal center frequency.

The present disclosure provides a design solution to the problem of frequency configuration of NR downlink carriers and synchronization signals as described above. With the solution of the present disclosure, the center frequency of the carrier and the center frequency of the synchronization signals can be configured independently, but meanwhile meeting the requirements of frequency division multiplexing (FDM) with multiple numerologies based on the nested structure. Another advantage of the design of the present disclosure is that the center frequency of the carrier and the center frequency of the synchronization signals can be finely adjusted to achieve a tradeoff among synchronization performance, synchronization complexity, and flexibility of network deployment by jointly considering various aspects. It should be noted that, in case of no conflict, the features in the embodiments and embodiments in the UE of the present disclosure can be applied to the base station, and vice versa. The features of the embodiments and the embodiments of the present disclosure may be combined with each other arbitrarily without conflict.

The present disclosure discloses a method for synchronization in a base station, comprising:

transmitting a first radio signal on first frequency-domain resources in a first time window; and transmitting a first signaling;

wherein a center frequency of the first frequency-domain resources is a first frequency; the first frequency-domain resources include X subcarrier(s); the X is a positive integer; a carrier to which the first frequency-domain resources belong is a first carrier; a frequency band to which the first carrier belongs is a first frequency band, a center frequency of the first carrier is a second frequency; an interval between the first frequency and the second frequency in frequency domain is a first frequency interval; the first frequency interval is related to a subcarrier spacing of the X subcarrier(s); the first radio signal is used to determine at least one of a location of the first time window in time domain, the first frequency; the first radio signal is broadcast; or the first radio signal is multicast; the first signaling is used to determine a feature ID of a transmitter of the first radio signal in the first carrier.

In one embodiment, by associating the first frequency interval with a subcarrier spacing of the X subcarrier(s), the PRBs occupied by the first radio signal and PRBs occupied by other transmissions using different numerologies may be aligned in frequency domain at PRB boundary to minimize resource fragmentation. This can meet the need of flexible network distribution at base station side, and can support flexible configuration of the first frequency at the same time.

In one embodiment, the carrier is the maximum contiguous frequency range that can be occupied by transmitted signals of a system.

In one embodiment, the band is a range of contiguous spectrum resources that can be allocated for a given operator according to spectrum allocation regulations.

In one embodiment, the first radio signal is generated by a feature sequence.

In one embodiment, the first radio signal is generated by a feature sequence, and the feature sequence is one of a Zadoff-Chu sequence, or a pseudo-random sequence.

In one embodiment, the first radio signal is generated by a Zadoff-Chu sequence of length 63.

In one embodiment, the first radio signal is generated by a Zadoff-Chu sequence having one of root indexes of {25, 29, 34}.

In one embodiment, the first radio signal is obtained by a feature sequence sequentially passing through a layer mapper, precoding, a resource element mapper, and baseband signal generation.

In one embodiment, the first radio signal is a Synchronization Channel (SCH).

In one embodiment, the first radio signal is a Primary Synchronization Signal (PSS).

In one embodiment, the first frequency-domain resources are contiguous in frequency domain.

In one embodiment, subcarrier spacings of the X subcarriers are equal.

In one embodiment, a subcarrier spacing of the X subcarrier(s) is one of 3.75 kHz, 7.5 kHz, 15 kHz, 30 kHz, 60 kHz, 120 kHz, 240 kHz or 480 kHz.

In one embodiment, the subcarrier spacings of two subcarriers in the X subcarrier(s) are unequal.

In one embodiment, the first frequency is at the center of one of the X subcarrier(s).

In one embodiment, the first frequency is at the boundary of two frequency-domain adjacent subcarriers in the X subcarriers.

In one embodiment, the X subcarrier(s) is(are) X Orthogonal Frequency Division Multiplexing (OFDMs) subcarrier(s).

In one embodiment, the first carrier contains subcarriers with equal subcarrier spacing.

In one embodiment, the first carrier contains two subcarriers with unequal subcarrier spacings.

In one embodiment, the frequency-domain bandwidth of the first carrier is fixed.

In one embodiment, the frequency-domain bandwidth of the first carrier is variable.

In one embodiment, the first carrier includes transmission frequency-domain resources and guard frequency-domain resources.

In one embodiment, the first frequency band is a pair of contiguous spectrum resources.

In one embodiment, the first frequency band is a single contiguous spectrum resource.

In one embodiment, the first frequency band is a Frequency Division Duplexing (FDD) frequency band.

In one embodiment, the first frequency band is a Time Division Duplexing (TDD) frequency band.

In one embodiment, the first frequency interval is related to a subcarrier spacing of the X subcarrier(s), which means that the first frequency interval is linearly related to a subcarrier spacing of the X subcarrier(s).

In one embodiment, the first frequency interval is related to a subcarrier spacing of the X subcarrier(s), which means that a subcarrier spacing of the X subcarrier(s) is used by the base station to determine the first frequency interval.

In one embodiment, the first frequency interval is related to a subcarrier spacing of the X subcarrier(s), which means that a subcarrier spacing of the X subcarriers is used by a user equipment (UE) to determine the first frequency interval.

In one embodiment, the first radio signal is used by a user equipment (UE) to determine at least one of a location of the first time window in time domain, the first frequency.

In one embodiment, the first time window is continuous in time domain.

In one embodiment, the first time window includes W consecutive OFDM symbols in time domain, the W being a positive integer, and the OFDM symbol comprises a Cyclic Prefix (CP) and a transmission symbol.

In one embodiment, the first time window includes 1 OFDM symbol in time domain.

In one embodiment, the location of the first time window in time domain refers to starting time of the first time window.

In one embodiment, the location of the first time window in time domain refers to an ending time of the first time window.

In one embodiment, the location of the first time window in time domain refers to a starting time of an OFDM symbol in the first time window.

In one embodiment, the location of the first time window in time domain refers to an ending time of an OFDM symbol in the first time window.

In one embodiment, the first signaling is physical layer signaling.

In one embodiment, the first signaling is high layer signaling.

In one embodiment, the first signaling is carried by Secondary Synchronization Signal (SSS).

In one embodiment, the first signaling is carried by a generation sequence of SSS.

In one embodiment, the first signaling is jointly carried by PSS and SSS.

In one embodiment, the first signaling explicitly indicates a physical layer ID of the base station corresponding to the first carrier.

In one embodiment, the first signaling implicitly indicates a physical layer ID of the base station corresponding to the first carrier.

In one embodiment, the transmitter of the first radio signal is a network side device composed of one or more Transmission Reception Point (TRP).

In one embodiment, the feature ID is a Cell ID.

In one embodiment, the feature ID is a Physical Cell ID (PCID).

In one embodiment, the feature ID is a transmitting beam ID corresponding to the first carrier.

According to one aspect of the present disclosure, the first frequency interval belongs to a target frequency interval set, and the target frequency interval set includes a positive integer number of frequency intervals; at least the first one of a subcarrier spacing of the X subcarrier(s), a frequency-domain bandwidth of the first frequency-domain resources, a location of the first frequency band in frequency domain, a frequency-domain bandwidth of the first carrier is used to determine the target frequency interval set out of Y frequency interval sets; the Y being a positive integer.

In one embodiment, the base station determines the first frequency interval in the target frequency interval set according to a configuration need, and the UE blindly detects the first radio signal in the target frequency interval set to determine the first frequency interval.

In one embodiment, the target frequency interval set includes only the first frequency interval.

In one embodiment, the frequency intervals in the target frequency interval set are all different.

In one embodiment, the Y frequency interval sets are all the same.

In one embodiment, there are two different frequency interval sets out of the Y frequency interval sets.

In one embodiment, at least the first one of a subcarrier spacing of the X subcarrier(s), a frequency domain bandwidth of the first frequency-domain resources, a location of the first frequency band in frequency domain, a frequency-domain bandwidth of the first carrier is used to determine the target frequency interval set out of the Y frequency interval sets by a given mapping relationship.

In one embodiment, the frequency-domain bandwidth of the first carrier refers to a transmission bandwidth of the first carrier.

In one embodiment, the frequency-domain bandwidth of the first carrier refers to a sum of a transmission bandwidth and a guard bandwidth of the first carrier.

According to one aspect of the present disclosure, further comprising:

transmitting a second signaling:

wherein the second signaling is used to determine a frequency interval other than the first frequency interval in the target frequency interval set.

In one embodiment, the second signaling is high layer signaling.

In one embodiment, the second signaling is a Radio Resource Control (RRC).

In one embodiment, the second signaling is physical layer signaling.

In one embodiment, the second signaling is a Master Information Block (MIB).

In one embodiment, the second signaling is carried by a Physical Broadcast Channel (PBCH).

In one embodiment, the second signaling explicitly indicates a frequency interval other than the first frequency interval in the target frequency interval set.

In one embodiment, the first signaling implicitly indicates a frequency interval other than the first frequency interval in the target frequency interval set.

According to one aspect of the present disclosure, wherein each frequency interval in the target frequency interval set is equal to a sum of a non-negative integer times of a unit frequency interval, a first frequency offset; or each frequency interval in the target frequency interval set is equal to a sum of a non-negative integer times of the unit frequency interval, half of the unit frequency interval, the first frequency offset; the unit frequency interval is equal to 12 times of a subcarrier spacing of the X subcarrier(s), a subcarrier spacing of each subcarrier in the X subcarriers is equal to a subcarrier spacing of the X subcarrier(s); the first frequency offset is a non-negative number that is less than half of the unit frequency interval; the first frequency offset is configurable; or the first frequency offset is a predefined fixed value.

In one embodiment, the unit frequency interval is equal to a width of a Physical Resource Block (PRB) in frequency domain.

In one embodiment, the first frequency offset is a frequency interval between the first frequency and a third frequency, the third frequency is a center frequency of second frequency-domain resources, and the second frequency-domain resources are consecutive PRB blocks occupied by the first wireless signal.

In one embodiment, the first frequency offset is equal to zero.

In one embodiment, the first frequency offset is equal to half of the subcarrier spacing of the X subcarrier(s).

In one embodiment, the first frequency offset is equal to J times of the subcarrier spacing of the X subcarrier(s), and J is a positive integer.

In one embodiment, the first frequency offset is equal to J and ½ times of the subcarrier spacing of the X subcarrier(s), and the J is a positive integer.

In one embodiment, the first frequency offset is less than or equal to 6 times of the subcarrier spacing of the X subcarrier(s).

In one embodiment, the first frequency offset is less than or equal to 5.5 times of the subcarrier spacing of the X subcarrier(s).

According to one aspect of the present disclosure, a frequency interval between the first frequency and a lowest frequency of the first frequency band is equal to a sum of P times of first raster and a second frequency offset; the P is a positive integer; the first raster is a predefined fixed frequency interval; or the first raster is determined by a location of the first frequency band in frequency domain; the second frequency offset is configurable; or the second frequency offset is a predefined value less than or equal to a first threshold; the first threshold is a non-negative number; the first threshold is smaller than the first raster; the first threshold is fixed; or the first threshold is determined by at least one of a location of the first frequency band in frequency domain, a subcarrier spacing of the X subcarrier(s).

In one embodiment, by introducing the second frequency offset, the transmitter of the first radio signal can flexibly control the frequency-domain resources location occupied when the first radio signal is transmitted, so that the flexibility of network deployment and the performance and complexity of UE synchronization can be comprehensively considered.

In one embodiment, the first raster is equal to 100 kHz.

In one embodiment, the first raster is equal to 200 kHz.

In one embodiment, the first raster is equal to a positive integer number of 100 kHz.

In one embodiment, the first raster is determined by the location of the first frequency band in frequency domain based on a given mapping relationship.

In one embodiment, the second frequency offset is equal to zero.

In one embodiment, the second frequency offset is one of K frequency offsets, the K is a positive integer, and each of the K frequency offsets is less than or equal to the first threshold.

In one embodiment, the first threshold is determined by at least one of a location of the first frequency band in frequency domain, a subcarrier spacing of the X subcarrier(s) based on a given mapping relationship.

In one embodiment, the first threshold is equal to zero.

In one embodiment, a unit of the first threshold is Hz.

In one embodiment, a unit of the first threshold is PPM.

According to one aspect of the present disclosure, the method further comprises:

transmitting a third signaling;

wherein the third signaling is used to determine the second frequency offset.

In one embodiment, the third signaling is high layer signaling.

In one embodiment, the third signaling is Radio Resource Control (RRC).

In one embodiment, the third signaling is physical layer signaling.

In one embodiment, the third signaling is Master Information Block (MIB).

In one embodiment, the third signaling is transmitted through Physical Broadcast Channel (PBCH).

In one embodiment, the third signaling is carried by Secondary Synchronization Signal (SSS).

In one embodiment, the third signaling is carried by a generation sequence of SSS.

In one embodiment, the third signaling is jointly carried by the SSS and the PBCH.

In one embodiment, the third signaling explicitly indicates the second frequency offset.

In one embodiment, the first signaling implicitly indicates the second frequency offset.

According to one aspect of the present disclosure, wherein a frequency interval between the second frequency and a lowest frequency of the first frequency band is equal to a sum of Q times of second raster and a third frequency offset; the Q is a positive integer; the second raster is a predefined fixed frequency interval; or the second raster is determined by a location of the first frequency band in frequency domain; the third frequency offset is a predefined value less than or equal to a second threshold; the second threshold is a non-negative value; the second threshold is fixed; or the second threshold is determined by at least one of a location of the first frequency band in frequency domain, a subcarrier spacing of the X subcarrier(s).

In one embodiment, the second raster is equal to 100 kHz.

In one embodiment, the second raster is equal to 200 kHz.

In one embodiment, the second raster is equal to a positive integer number of 100 kHz.

In one embodiment, the second raster is determined by the location of the first band in frequency domain based on a given mapping relationship.

In one embodiment, the third frequency offset is zero.

In one embodiment, the third frequency offset is greater than zero.

In one embodiment, the third frequency offset is one of L frequency offsets, the L is a positive integer, and each of the L frequency offsets is less than or equal to a first threshold.

In one embodiment, the second threshold is determined by at least one of a location of the first frequency band in frequency domain, a subcarrier spacing of the X subcarrier(s) based on a given mapping relationship.

In one embodiment, the second threshold is equal to zero.

In one embodiment, the unit of the second threshold is Hz.

In one embodiment, a unit of the second threshold is PPM.

The present disclosure discloses a method for synchronization in a user equipment, comprising:

receiving a first radio signal on first frequency-domain resources in a first time window; and receiving a first signaling;

wherein a center frequency of the first frequency-domain resources is a first frequency; the first frequency-domain resources include X subcarrier(s); the X is a positive integer; a carrier to which the first frequency-domain resources belong is a first carrier; a frequency band to which the first carrier belongs is a first frequency band; a center frequency of the first carrier is a second frequency; a interval between the first frequency and the second frequency in frequency domain is a first frequency interval; the first frequency interval is related to a subcarrier spacing of the X subcarrier(s); the first radio signal is used to determine at least one of a location of the first time window in time domain, the first frequency. The first radio signal is broadcast, or the first radio signal is multicast; the first signaling is used to determine a feature ID of a transmitter of the first radio signal in the first carrier.

According to one aspect of the present disclosure, the first frequency interval belongs to a target frequency interval set; the target frequency interval set includes a positive integer number of frequency intervals; at least the first one of a subcarrier spacing of the X subcarrier(s), a frequency-domain bandwidth of the first frequency-domain resources, a location of the first frequency band in frequency domain, a frequency-domain bandwidth of the first carrier is used to determine the target frequency interval set out of Y frequency interval sets; the Y is a positive integer.

According to one aspect of the present disclosure, the method further comprises:

receiving a second signaling;

wherein the second signaling is used to determine a frequency interval other than the first frequency interval in the target frequency interval set.

According to one aspect of the present disclosure, each frequency interval in the target frequency interval set is equal to a sum of a non-negative integer times of a unit frequency interval, a first frequency offset; or each frequency interval in the target frequency interval set is equal to a sum of a non-negative integer times of the unit frequency interval, half of the unit frequency interval, the first frequency offset; the unit frequency interval is equal to 12 times of a subcarrier spacing of the X subcarrier(s); a subcarrier spacing of each subcarrier in the X subcarrier(s) is equal to a subcarrier spacing of the X subcarrier(s); the first frequency offset is a non-negative number that is less than half of the unit frequency interval; the first frequency offset is configurable; or the first frequency offset is a predefined fixed value.

According to one aspect of the present disclosure, a frequency interval between the first frequency and a lowest frequency of the first frequency band is equal to a sum of P times of first raster and a second frequency offset; the P is a positive integer; the first raster is a predefined fixed frequency interval; or the first raster is determined by a location of the first frequency band in frequency domain; the second frequency offset is configurable; or the second frequency offset is a predefined value less than or equal to a first threshold; the first threshold is a non-negative number; the first threshold is smaller than the first raster, and the first threshold is fixed; or the first threshold is determined by at least one of a location of the first frequency band in frequency domain, a subcarrier spacing of the X subcarrier(s).

According to one aspect of the present disclosure, the method further comprises:

receiving a third signaling;

wherein the third signaling is used to determine the second frequency offset.

According to one aspect of the present disclosure, a frequency interval between the second frequency and a lowest frequency of the first frequency band is equal to a sum of Q times of second raster and a third frequency offset;

the Q is a positive integer; the second raster is a predefined fixed frequency interval; or the second raster is determined by a location of the first frequency band in frequency domain; the third frequency offset is a predefined value less than or equal to a second threshold; the second threshold is a non-negative number; the second threshold is fixed; or the second threshold is determined by at least one of a location of the first frequency band in frequency domain, a subcarrier spacing of the X subcarrier(s).

The present disclosure discloses a base station used for synchronization, which comprises:

a first transmitter, transmitting a first radio signal on first frequency-domain resources in a first time window; and a second transmitter, transmitting a first signaling;

wherein a center frequency of the first frequency-domain resources is a first frequency; the first frequency-domain resources include X subcarrier(s); the X is a positive integer; a carrier to which the first frequency-domain resources belong is a first carrier; a frequency band to which the first carrier belongs is a first frequency band; a center frequency of the first carrier is a second frequency; an interval between the first frequency and the second frequency in frequency domain is a first frequency interval; the first frequency interval is related to a subcarrier spacing of the X subcarrier(s); the first radio signal is used to determine at least one of a location of the first time window in time domain, the first frequency; the first radio signal is broadcast; or the first radio signal is multicast; the first signaling is used to determine a feature ID of a transmitter of the first radio signal in the first carrier.

According to one aspect of the present disclosure, the first frequency interval belongs to a target frequency interval set; the target frequency interval set includes a positive integer number of frequency intervals; at least the first one of a subcarrier spacing of the X subcarrier(s), a frequency-domain bandwidth of the first frequency-domain resources, a location of the first frequency band in frequency domain, a frequency-domain bandwidth of the first carrier is used to determine the target frequency interval set out of Y frequency interval sets; the Y is a positive integer.

According to one aspect of the present disclosure, the second transmitter further transmits a second signaling; the second signaling is used to determine a frequency interval other than the first frequency interval in the target frequency interval set.

According to one aspect of the present disclosure, each frequency interval in the target frequency interval set is equal to a sum of a non-negative integer times of a unit frequency interval, a first frequency offset; or each frequency interval in the target frequency interval set is equal to a sum of a non-negative integer times of the unit frequency interval, half of the unit frequency interval, the first frequency offset; the unit frequency interval is equal to 12 times of a first subcarrier spacing; a subcarrier spacing of each subcarrier in the X subcarrier(s) is equal to a subcarrier spacing of the X subcarrier(s); the first frequency offset is a non-negative number that is less than a half of the unit frequency interval; the first frequency offset is configurable; or the first frequency offset is a predefined fixed value.

According to one aspect of the present disclosure, a frequency interval between the first frequency and a lowest frequency of the first frequency band is equal to a sum of P times of first raster and a second frequency offset; the P is a positive integer; the first raster is a predefined fixed frequency interval; or the first raster is determined by a location of the first frequency band in frequency domain; the second frequency offset is configurable; or the second frequency offset is a predefined value that is less than or equal to a first threshold; the first threshold is a non-negative number; the first threshold is smaller than the first raster; the first threshold is fixed; or the first threshold is determined by at least one of a location of the first frequency band in frequency domain, a subcarrier spacing of the X subcarrier(s).

According to one aspect of the present disclosure, the second transmitter further transmits a third signaling; the third signaling is used to determine the second frequency offset.

According to one aspect of the present disclosure, a frequency interval between the second frequency and a lowest frequency of the first frequency band is equal to a sum of Q times of second raster and a third frequency offset; the Q is a positive integer; the second raster is a predefined fixed frequency interval; or the second raster is determined by a location of the first frequency band in frequency domain; the third frequency offset is a predefined value that is less than or equal to a second threshold; the second threshold is a non-negative number; the second threshold is fixed; or the second threshold is determined by at least one of a location of the first frequency band in frequency domain, a subcarrier spacing of the X subcarrier(s).

The present disclosure discloses a user equipment used for synchronization, which comprises:

a first receiver, receiving a first radio signal on first frequency-domain resources in a first time window; and a second receiver, receiving a first signaling;

wherein a center frequency of the first frequency-domain resources is a first frequency; the first frequency-domain resources include X subcarrier(s); the X is a positive integer; a carrier to which the first frequency-domain resources belong is a first carrier; a frequency band to which the first carrier belongs is a first frequency band; a center frequency of the first carrier is a second frequency; an interval between the first frequency and the second frequency in frequency domain is a first frequency interval; the first frequency interval is related to a subcarrier spacing of the X subcarrier(s); the first radio signal is used to determine at least one of a location of the first time window in time domain, the first frequency; the first radio signal is broadcast; or the first radio signal is multicast; the first signaling is used to determine a feature ID of a transmitter of the first radio signal in the first carrier.

According to one aspect of the present disclosure, the first frequency interval belongs to a target frequency interval set; the target frequency interval set includes a positive integer number of frequency intervals; at least the first one of a subcarrier spacing of the X subcarrier(s), a frequency-domain bandwidth of the first frequency-domain resources, a location of the first frequency band in frequency domain, a frequency-domain bandwidth of the first carrier is used to determine the target frequency interval set out of Y frequency interval sets; the Y is a positive integer.

According to one aspect of the present disclosure, the second receiver further receives a second signaling; the second signaling is used to determine a frequency interval other than the first frequency interval in the target frequency interval set.

According to one aspect of the present disclosure, each frequency interval in the target frequency interval sets is equal to a sum of a non-negative integer times of a unit frequency interval, a first frequency offset; or each frequency interval in the target frequency interval set is equal to a sum of a non-negative integer of the unit frequency interval, half of the unit frequency interval, the first frequency offset; the unit frequency interval is equal to 12 times of a first subcarrier spacing; a subcarrier spacing of each subcarrier in the X subcarrier(s) is equal to a subcarrier spacing of the X subcarrier(s); the first frequency offset is a non-negative number that is less than a half of the unit frequency spacing; the first frequency offset is configurable; or the first frequency offset is a predefined fixed value.

According to one aspect of the present disclosure, a frequency interval between the first frequency and a lowest frequency of the first frequency band is equal to a sum of P times of first raster and a second frequency offset; the P is a positive integer; the first raster is a predefined fixed frequency interval; or the first raster is determined by a location of the first frequency band in frequency domain; the second frequency offset is configurable; or the second frequency offset is a predefined value that is less than or equal to a first threshold; the first threshold is a non-negative number; the first threshold is smaller than the first raster; the first threshold is fixed; or the first threshold is determined by at least one of a location of the first frequency band in frequency domain, a subcarrier spacing of the X subcarrier(s).

According to one aspect of the present disclosure, the second receiver further receives a third signaling; the third signaling is used to determine the second frequency offset.

According to one aspect of the present disclosure, a frequency interval between the second frequency band and a lowest frequency of the first interval is equal to a sum of Q times of second raster and a third frequency offset; the Q is a positive integer; the second raster is a predefined fixed frequency interval; or the second raster is determined by a location of the first frequency band in frequency domain; the third frequency offset is a predefined value that is less than or equal to a second threshold; the second threshold is a non-negative number; the second threshold is fixed; or the second threshold is determined by at least one of a location of the first frequency band in frequency domain, a subcarrier spacing of the X subcarrier(s).

In one embodiment, the present disclosure has the following technical advantages.

The carrier frequency and the frequency of synchronization signals can follow the nested structure of FDM with different numerologies, thus avoiding the fragmentation of resources.

Flexible configuration of carrier center frequency and synchronization signal center frequency, comprehensive consideration of network deployment, synchronization performance and synchronization complexity, so that a tradeoff can be achieved as needed.

Getting rid of the restriction that the carrier center frequency must be consistent with the synchronization signal center frequency, so that the base station can more flexibly configure the frequency resources with different numerologies.

BRIEF DESCRIPTION OF THE DRAWINGS

Other features, objects, and advantages of the present disclosure will become more apparent from the detailed description of the accompanying drawings.

DESCRIPTION OF THE EMBODIMENTS

The following description with reference to the accompanying drawings is provided to explain the exemplary embodiments of the disclosure. Note that in case of no conflict, the embodiments of the present disclosure and the features of the embodiments may be arbitrarily combined with each other.

Embodiment 1

Figure 1:
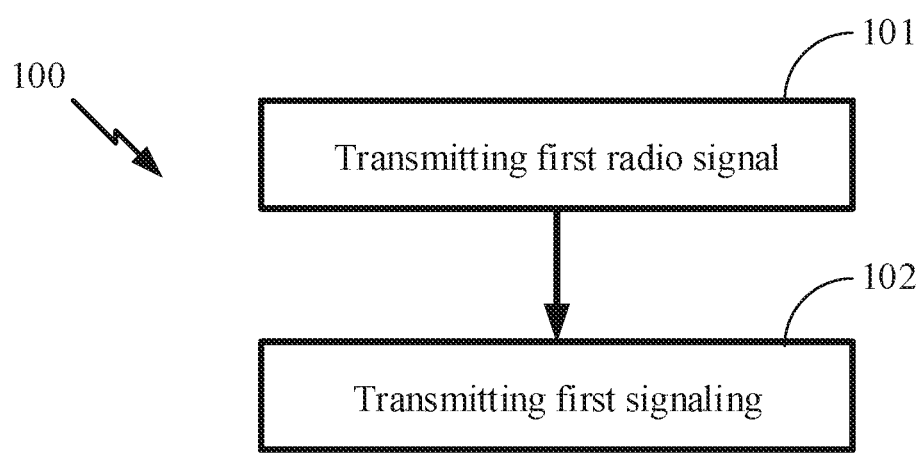
FIG. 1 shows a flow chart of transmission of a first radio signal and first signaling according to one embodiment of the present disclosure.

Embodiment 1 illustrates a flow chart of transmission of a first radio signal and a first signaling according to an embodiment of the present disclosure, as shown in FIG. 1. In FIG. 1, each box represents a step. In embodiment 1, the base station in the present disclosure first transmits the first radio signal on first frequency-domain resources in the first time window; then transmits the first signaling; wherein the center frequency of the first frequency domain resources is a first frequency; the first frequency domain resources includes X subcarrier(s), the X is a positive integer, the carrier to which the first frequency domain resources belongs is a first carrier, and the frequency band to which the first carrier belongs is a frequency band, the center frequency of the first carrier is a second frequency; an interval between the first frequency and the second frequency in the frequency domain is a first frequency interval; the first frequency interval is related to a subcarrier spacing of the X subcarrier(s); the first radio signal is used to determine at least one of a location of the first time window in a time domain, the first frequency; the first radio signal is broadcast; or the first radio signal is multicast; the first signaling is used to determine a feature ID of a transmitter of the first radio signal in the first carrier.

In one embodiment, the carrier is the largest continuous frequency domain range that can be occupied by the transmitted signal of a system.

In one embodiment, the band is a range of continuous spectrum resources that can be allocated for a given operator according to spectrum allocation regulations.

In one embodiment, the first radio signal is generated by a feature sequence.

In one embodiment, the first radio signal is a PSS (Primary Synchronization Signal).

In one embodiment, the subcarrier spacing of the X subcarrier(s) is one of 3.75 kHz, 7.5 kHz, 15 kHz, 30 kHz, 60 kHz, 120 kHz, 240 kHz, and 480 kHz.

In one embodiment, the subcarrier spacing of the two subcarriers in the X subcarrier(s) is unequal.

In one embodiment, the first frequency is at the center of one of the X subcarrier(s).

In one embodiment, the first frequency is at the boundary of two frequency domain adjacent subcarriers of the X subcarrier(s).

In one embodiment, the first frequency band is a pair of continuous spectrum resources.

In one embodiment, the first frequency band is a single continuous spectrum resource.

In one embodiment, the first frequency band is a Frequency Division Duplexing (FDD) frequency band.

In one embodiment, the first frequency band is a Time Division Duplexing (TDD) frequency band.

In one embodiment, the first frequency interval is related to the subcarrier spacing of the X subcarrier(s), which means that the first frequency interval is linearly related to the subcarrier spacing of the X subcarrier(s).

In one embodiment, the first frequency interval is related to the subcarrier spacing of the X subcarrier(s), which means that the subcarrier spacing of the X subcarrier(s) is used by the base station to determine the first frequency interval.

In one embodiment, the first signaling is carried through Secondary Synchronization Signal (SSS).

In one embodiment, the first signaling is carried through a generation sequence of the SSS.

In one embodiment, the first signaling is jointly carried through the PSS and the SSS.

In one embodiment, the feature ID is a Physical Cell ID (PCID).

Embodiment 2

Figure 2:
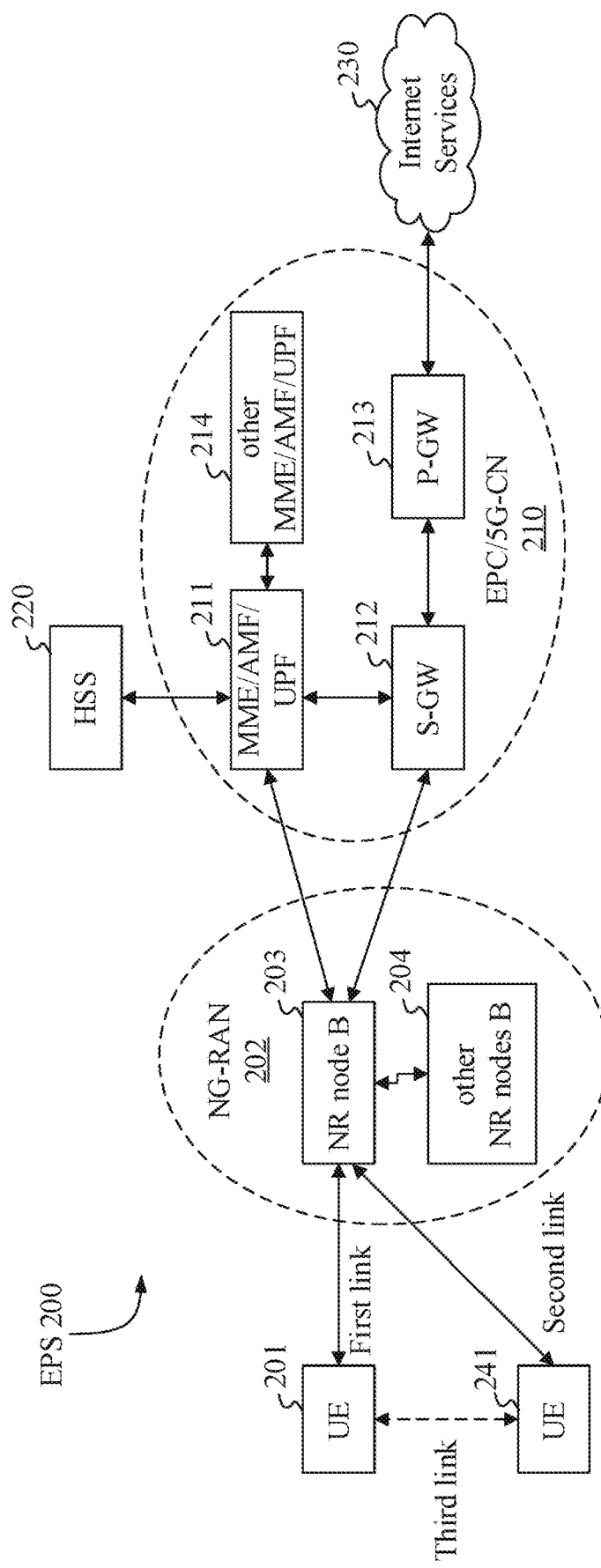
FIG. 2 shows a schematic diagram of a network architecture according to another one embodiment of the present disclosure.

Embodiment 2 shows a schematic diagram of network architecture, as shown in FIG. 2. FIG. 2 describes a system network structure 200 of NR 5G, long-term evolution (LTE) and long-term evolution advanced (LTE-A). The network architecture 200 of NR 5G or LTE may be referred to as an evolve packet system (EPS) 200 or some other suitable terminology. The EPS 200 may include one or more UEs 201, radio access network (NG-RAN) 202, 5G-core network (CN)/evolved packet core (EPC) 210, Home Subscriber Server (HSS) 220 and the internet service 230. EPS may be interconnected with other access networks, but for the sake of simplicity, these entities/interfaces are not shown. As shown in FIG. 2, the EPS provides the packet switching services. Those skilled in the art would understand that the various concepts presented throughout this disclosure can be extended to networks or other cellular networks that provide circuit switched services. The NG-RAN includes an NR Node B (gNB) 203 and other gNBs 204. The gNB 203 provides user and control plane protocol termination for the UE 201. The gNB 203 can be connected to other gNBs 204 via an Xn interface (eg, a backhaul). The gNB 203 may also be referred to as a base station, a base transceiver station, a wireless base station, a wireless transceiver, a transceiver function, a basic service set (BSS), an extended service set (ESS), a TRP (transmission and reception point), or some other applicable terminology. The gNB 203 provides the UE201 with an access point to the 5G-CN/EPC 210. In the embodiment, the UE201 includes cellular telephones, smart phones, Session Initiation Protocol (SIP) phones, laptop computers, personal digital assistants (PDAs), satellite wirelesses, non-terrestrial base station communications, satellite mobile communications, global positioning systems, multimedia devices, video devices, digital audio player (e.g. MP3 players), cameras, game consoles, drones, aircrafts, narrowband physical network devices, machine type communication devices, land vehicles, cars, wearable devices, or any other similar to functional devices. A person skilled in the art may also refer to UE 201 as a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, remote terminal, handset, user agent, mobile client, client or some other suitable term. The gNB 203 is connected to the 5G-CN/EPC 210 through an S1/NG interface. 5G-CN/EPC 210 includes MME/AMF/UPF 211, other Mobility Management Entity (MME)/Authentication Management Field (AMF)/User Plane Function (UPF) 214 An Service Gateway (S-GW) 212 and a Packet Date Network Gateway (P-GW) 213. The MME/AMF/UPF 211 is a control node that handles signaling between the UE 201 and the 5G-CN/EPC 210. In general, MME/AMF/UPF 211 provides bearer and connection management. All User Internet Protocol (IP) packets are transmitted through the S-GW 212, and the S-GW 212 itself is connected to the P-GW 213. The P-GW 213 provides UE IP address allocation as well as other functions. The P-GW 213 is connected to the internet service 230. The internet service 230 includes an operator-compatible internet protocol service, and may specifically include the Internet, an intranet, an IP Multimedia Subsystem (IMS), and a PS Streaming Service (PSS).

In one embodiment, the UE 201 corresponds to the user equipment in this disclosure.

In one embodiment, the gNB203 corresponds to the base station in this disclosure.

In one embodiment, the UE 201 supports transmission over multiple frequency bands.

In one embodiment, the gNB203 supports transmission over multiple frequency bands.

In one embodiment, the UE 201 supports transmission over a millimeter frequency band.

In one embodiment, the gNB203 supports transmission over a millimeter frequency band.

Embodiment 3

Figure 3:
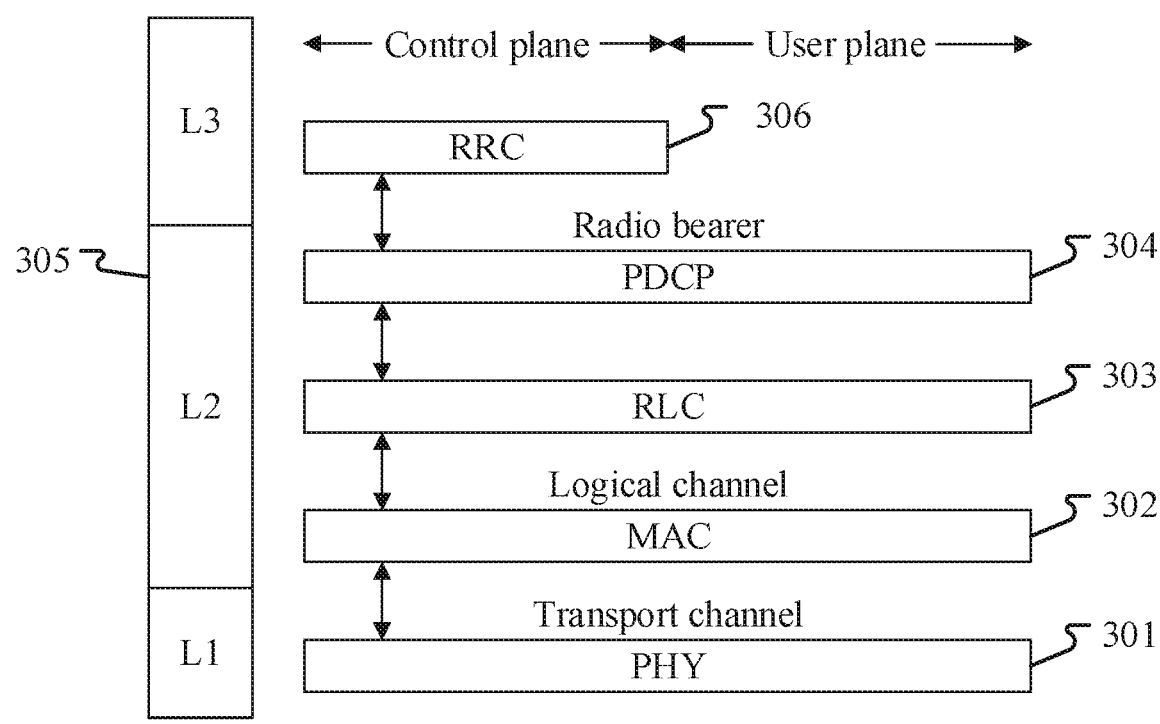
FIG. 3 shows a schematic diagram of a radio protocol architecture of a user plane and a control plane according to one embodiment of the present disclosure.

Embodiment 3 shows a schematic diagram of radio protocol architecture of a user plane and a control plane according to the present disclosure, as shown in FIG. 3. FIG. 3 is a schematic diagram illustrating an embodiment of a radio protocol architecture for a user plane and a control plane, and FIG. 3 shows a radio protocol architecture for the user equipment (UE) and the base station equipment (gNB or eNB) in three layers: layer 1, layer 2 and layer 3. Layer 1 (L1 layer) is the lowest layer and implements various physical layer (PHY) signal processing functions, and layers above layer 1 belong to higher layers. The L1 layer will be referred to herein as PHY 301. Layer 2 (L2 layer) 305 is above PHY 301 and is responsible for the link between the UE and the gNB through PHY 301. In the user plane, L2 layer 305 comprises a media access control (MAC) sub-layer 302, a radio link control (RLC) sub-layer 303 and a packet data convergence protocol (PDCP) sub-layer 304, and these sub-layers terminate at the gNB on the network side. Although not illustrated, the UE may have several upper layers above the L2 layer 305, including a network layer (e.g. an IP layer) terminated at the P-GW on the network side and terminated at the other end of the connection (e.g. Application layer at the remote UE, server, etc.). The PDCP sub-layer 304 provides multiplexing between different wireless bearers and logical channels. The PDCP sublayer 304 also provides header compression for upper layer data packets to reduce wireless transmission overhead, and provides the security by encrypting data packets, and provides handoff support for UEs between gNBs. The RLC sublayer 303 provides segmentation and reassembly of upper layer data packets, retransmission of lost packets and the reordering of data packets to compensate for the disordered reception resulted by the hybrid automatic repeat request (HARQ). The MAC sublayer 302 provides multiplexing between the logical and transport channels. The MAC sublayer 302 is also responsible for allocating various wireless resources (e.g. resource blocks) in one cell between UEs. The MAC sublayer 302 is also responsible for HARQ operations. In the control plane, the radio protocol architecture for the UE and gNB is substantially the same for the physical layer 301 and the L2 layer 305, but there is no header compression function for the control plane. The control plane also includes an Radio Resource Control (RRC) sublayer 306 in Layer 3 (L3 layer). The RRC sublayer 306 is responsible for obtaining wireless resources (i.e. wireless bearers) and configuring the lower layer using RRC signaling between the gNB and the UE.

In one embodiment, the radio protocol architecture of FIG. 3 is applicable to the user equipment in this disclosure.

In one embodiment, the radio protocol architecture of FIG. 3 is applicable to the base station in this disclosure.

In one embodiment, the first radio signal in the present disclosure is generated by the PHY 301.

In one embodiment, the first signaling in the present disclosure is generated by the PHY 301.

In one embodiment, the second signaling in the present disclosure is generated in the RRC 306.

In one embodiment, the third signaling in the present disclosure is generated in the RRC 306.

Embodiment 4

Figure 4:
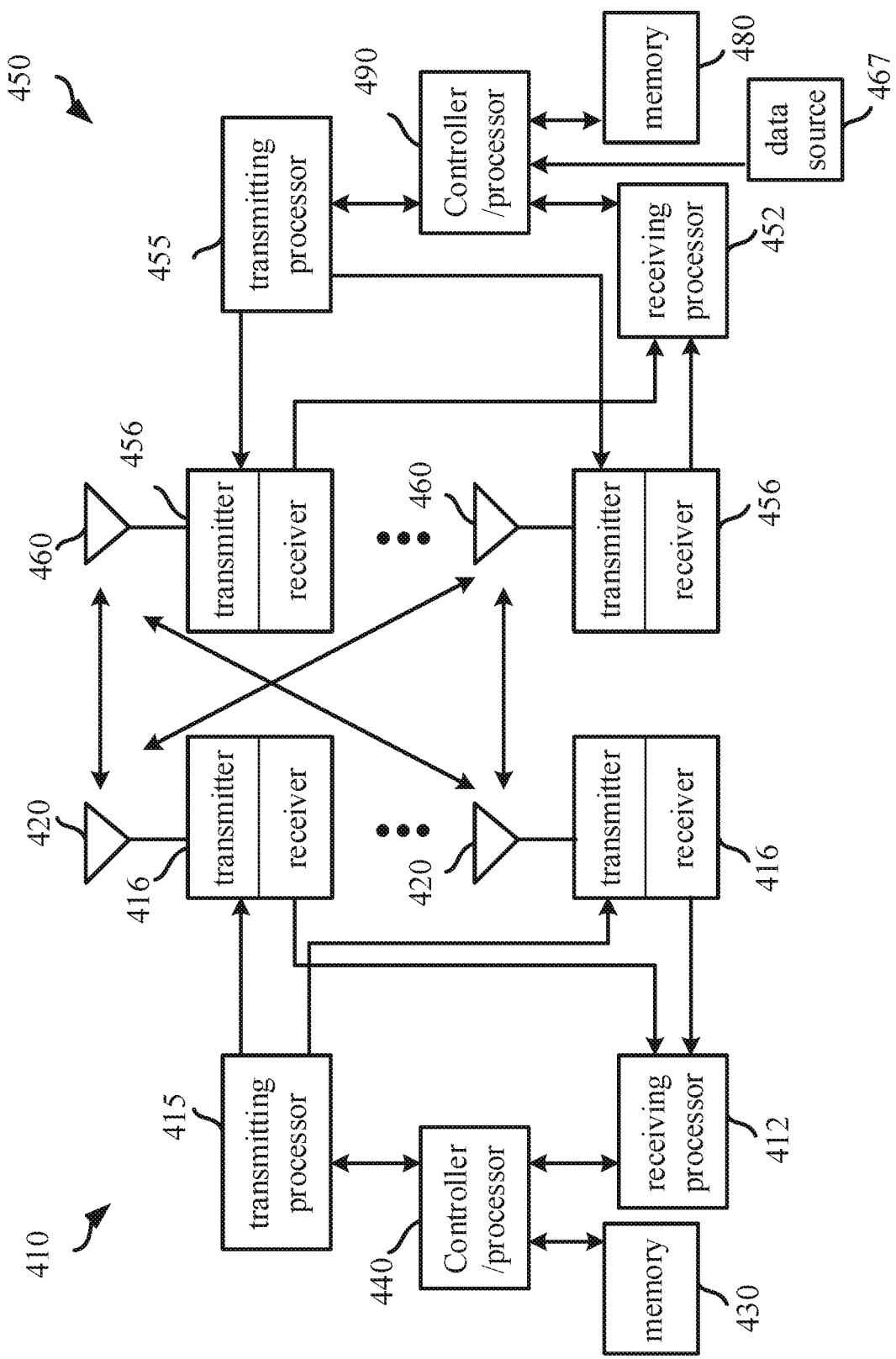
FIG. 4 shows a schematic diagram of a base station and a user equipment according to one embodiment of the present disclosure.

Embodiment 4 shows a schematic diagram of base station equipment and user equipment according to the present disclosure, as shown in FIG. 4. FIG. 4 is a block diagram of a gNB 410 in communication with a UE 450 in an access network.

The user equipment (UE 450) includes a controller/processor 490, a memory 480, a receiving processor 452, a transmitter/receiver 456, a transmitting processor 455 and a data source 467, and the transmitter/receiver 456 includes an antenna 460. The controller/processor 490 provides header compression decompression, encryption decryption, packet segmentation and reordering, and multiplexing and demultiplexing between logical and transport channels to the upper layer packet which came from the data source 467 to implement L2 layer protocol of the user plane and the control plane. The upper layer packet may include data or control information, such as DL-SCH or UL-SCH. The transmitting processor 455 implements for the L1 layer (i.e. physical layer) of the various signal processing functions including coding, interleaving, scrambling, modulation, power control/allocation, precoding and physical layer control signaling generation, etc. The receiving processor 452 implements for the L1 layer (i.e. physical layer) of the various signal processing functions including decoding, deinterleaving, descrambling, demodulation, de-precoding, and physical layer control signaling extraction, etc. The transmitter 456 is configured to convert the baseband signal provided by the transmitting processor 455 into a radio frequency signal and transmits it via the antenna 460. The receiver 456 converts the radio frequency signal received by the antenna 460 into a baseband signal and provides it to the receiving processor 452.

A base station (410) may include a controller/processor 440, a memory 430, a receiving processor 412, a transmitter/receiver 416 and a transmitting processor 415, and the transmitter/receiver 416 includes an antenna 420. The controller/processor 440 provides header compression decompression, encryption and decryption, packet segmentation and reordering, and multiplexing and demultiplexing between the logical and transport channels when the upper layer packet arrives, for implementing L2 layer protocol of the user plane and the control plane. The upper layer packet may include data or control information such as DL-SCH or UL-SCH. The transmit processor 415 implements for the L1 layer (ie, the physical layer) of the various signal transmission processing functions including coding, interleaving, scrambling, modulation, power control/allocation, precoding, and physical layer control signaling (including PBCH, PDCCH, PHICH, PCFICH, reference signal) generation, etc. the receive processor 412 implements for the L1 layer (ie, the physical layer) of various signal receiving processing functions including decoding, deinterleaving, descrambling, demodulation, de-precoding, and physical layer control signaling extraction, and the like. The transmitter 416 is configured to convert the baseband signal provided by the transmitting processor 415 into a radio frequency signal and transmit it via the antenna 420. The receiver 416 is configured to convert the radio frequency signal received by the antenna 420 into a baseband signal and provide it to the receiving processor 412.

In DL (Downlink), the upper layer packet includes the second signaling and the third signaling in the present disclosure provided to the controller/processor 440. The controller/processor 440 performs the functionality of the L2 layer and above. The transmitting processor 415 implements for the L1 layer (ie, the physical layer) of the various signal processing functions including sequence generation, baseband signal generation, physical resource mapping, etc., and then the transmitting processor 415 via the transmitter 416 mapping to the antenna 420 and transmitted it in the form of a radio frequency signal. The first radio signal and the first signaling in this application are by a transmitting processor 415 via a transmitter 416 mapping to an antenna 420 and transmitted in the form of a radio frequency signal. At the receiving end, each receiver 456 receives radio frequency signals through its respective antenna 460, each receiver 456 recovers the baseband information modulated onto the radio frequency carrier and provides baseband information to the receiving processor 452. The receiving processor 452 implements for the L1 layer of various signal receiving processing functions that includes detecting the first radio signal and the first signaling in the present disclosure, carrying the second signaling, and the receiving the physical layer signal of the third signaling, etc., and then provide the required data and/or control signal to the controller/processor 490. The controller/processor 490 implements the L2 layer and above. The controller/processor can be associated with a memory 480 that stores program codes and data. The memory 480 can be referred to as a computer readable medium.

In one embodiment, the gNB 410 device comprises: at least one processor and at least one memory, the at least one memory comprises computer program codes; the at least one memory and the computer program code are configured to be operated with at least one processor together. The gNB410 device at least: transmitting first radio signal on the first frequency domain resources in the first time window; transmitting a first signaling; wherein the center frequency of the first frequency domain resources is the first frequency; the first frequency domain resources includes X subcarrier (s); the X is a positive integer; the carrier to which the first frequency domain resources belongs is the first carrier, and the frequency band to which the first carrier belongs is the first frequency band; the center frequency of the first carrier is a second frequency; the interval between the first frequency and the second frequency in the frequency domain is a first frequency interval; the first frequency interval is related to a subcarrier spacing of the X subcarrier(s); the first radio signal is used to determine at least one of a location of the first time window in time domain, the first frequency; the first radio signal is broadcast; or the first radio signal is multicast; the first signaling is used to determine a feature ID of a transmitter of the first radio signal in the first carrier.

As an embodiment, the gNB 410 includes: a memory storing a computer readable instruction program, which generates an action when executed by at least one processor, the action comprising: transmitting the first radio signal on the first frequency domain resources in the first time window; transmitting the first signaling; wherein the center frequency of the first frequency domain resources is the first frequency; the first frequency domain resources includes X subcarrier(s); the X is a positive integer; the carrier to which the first frequency domain resources belongs is the first carrier, and the frequency band to which the first carrier belongs is the first frequency band; the center frequency of the first carrier is a second frequency; the interval between the first frequency and the second frequency in the frequency domain is a first frequency interval; the first frequency interval is related to a subcarrier spacing of the X subcarrier(s); the first radio signal is used to determine at least one of a location of the first time window in a time domain, the first frequency; the first radio signal is broadcast; or the first radio signal is multicast; the first signaling is used to determine a feature ID of a transmitter of the first radio signal in the first carrier.

In one embodiment, the UE 450 includes: at least one processor and at least one memory, the at least one memory further comprising computer program code; the at least one memory and the computer program code are configured to operate with the processor together, the UE 450 at least: receiving the first radio signal on the first frequency domain resources in the first time window; receiving the first signaling; wherein a center frequency of the first frequency domain resources is a first frequency; the first frequency domain resources includes X subcarrier(s); the X is a positive integer; a carrier to which the first frequency domain resources belongs is a first carrier; a frequency band to which the first carrier belongs is a first frequency band; a center frequency of the first carrier is a second frequency; an interval between the first frequency and the second frequency in a frequency domain is a first frequency interval; the first frequency interval is related to a subcarrier spacing of the X subcarrier(s); the first radio signal is used to determine at least one of a location of the first time window in a time domain, the first frequency; the first radio signal is broadcast; or the first radio signal is multicast; the first signaling is used to determine a feature ID of a transmitter of the first radio signal in the first carrier.

In one embodiment, the UE 450 includes: a memory storing a computer readable instruction program, which generates an action when executed by at least one processor, the action comprising: receiving the first radio signal on the first frequency domain resources in the first time window; receiving the first signaling; wherein a center frequency of the first frequency domain resources is a first frequency; the first frequency domain resources includes X subcarrier(s); the X is a positive integer; a carrier to which the first frequency domain resources belongs is a first carrier; a frequency band to which the first carrier belongs is a first frequency band; a center frequency of the first carrier is a second frequency; an interval between the first frequency and the second frequency in a frequency domain is a first frequency interval; the first frequency interval is related to a subcarrier spacing of the X subcarrier(s); the first radio signal is used to determine at least one of a location of the first time window in a time domain, the first frequency; the first radio signal is broadcast; or the first radio signal is multicast; the first signaling is used to determine a feature ID of a transmitter of the first radio signal in the first carrier.

In one embodiment, the UE 450 corresponds to the user equipment in this disclosure.

In one embodiment, gNB 410 corresponds to the base station in this disclosure.

In one embodiment, the receiver 456 (including antenna 460) and the receiving processor 452 are configured to receive the first radio signal in this disclosure.

In one embodiment, the receiver 456 (including antenna 460) and the receiving processor 452 are configured to receive the first signaling in this disclosure.

In one embodiment, the receiver 456 (including antenna 460), the receiving processor 452 and the controller/processor 490 are configured to receive the second signaling in this disclosure.

In one embodiment, the receiver 456 (including antenna 460), the receiving processor 452 and the controller/processor 490 are configured to receive the third signaling in this disclosure.

In one embodiment, the transmitter 416 (including antenna 420) and the transmitting processor 415 are configured to transmit the first radio signal in this disclosure.

In one embodiment, the transmitter 416 (including antenna 420) and the transmitting processor 415 are configured to transmit the first signaling in this application.

In one embodiment, the transmitter 416 (including antenna 420), the transmitting processor 415 and the controller/processor 440 are configured to transmit the second signaling in this disclosure.

In one embodiment, the transmitter 416 (including antenna 420), the transmitting processor 415 and the controller/processor 440 are configured to transmit the third signaling in this disclosure.

Embodiment 5

Figure 5:
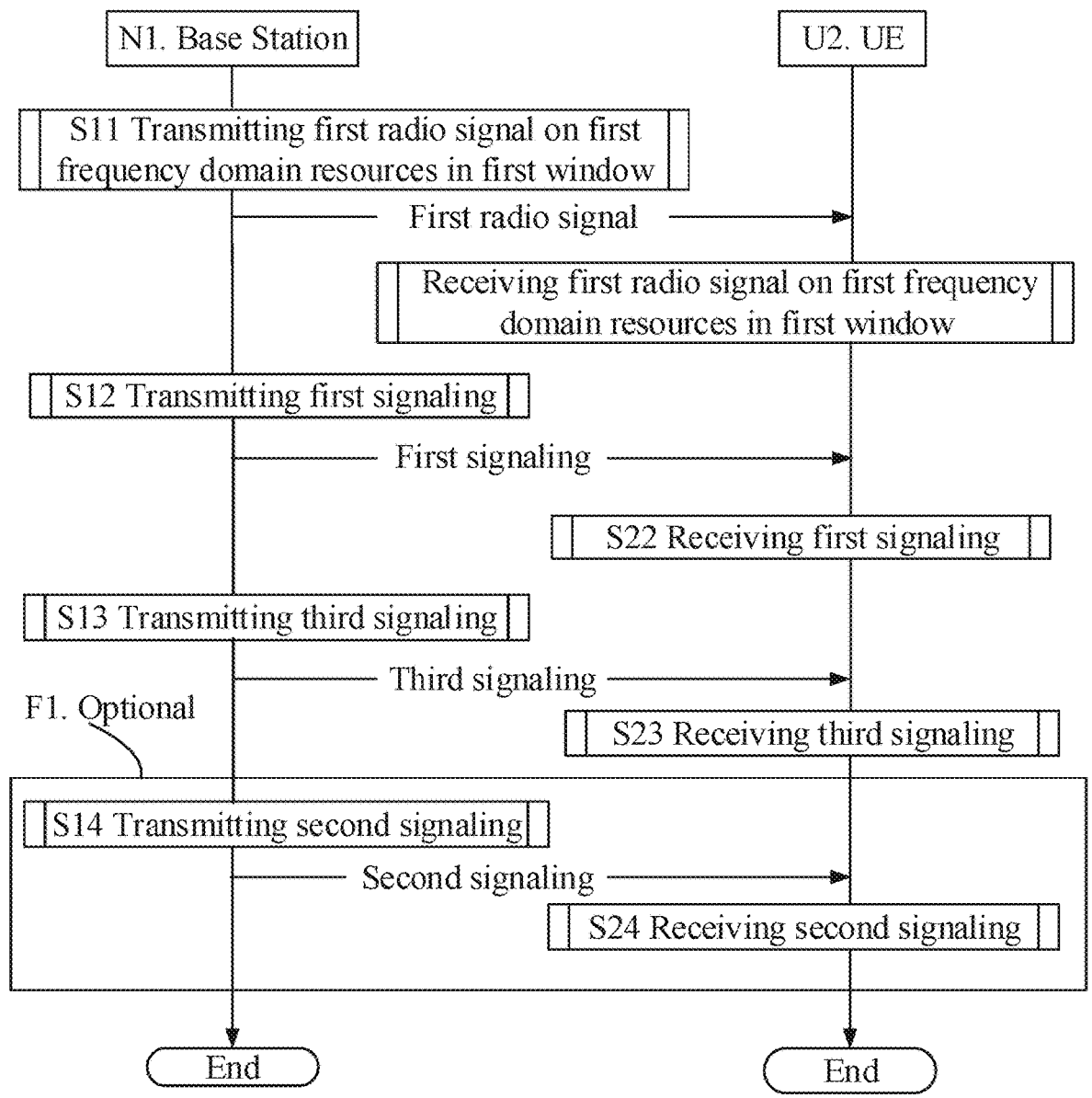
FIG. 5 shows a flowchart of downlink transmission of radio signals according to one embodiment of the present disclosure.

Embodiment 5 illustrates a flowchart of a downlink transmission of a wireless signal, as shown in FIG. 5. In FIG. 5, the base station N01 is a maintenance base station of the serving cell of the user equipment U02, and the steps in the box identified ash F1 are optional.

For the base station N01, in step S11, the base station N01 transmits a first radio signal on the first frequency domain resources in a first time window; in step S12, the base station N01 transmits a first signaling; in step S13, the base station N01 transmits a third signaling; in step S14, the base station N01 transmits a second signaling.

For the user equipment U02, in step S21, the user equipment U02 receives a first radio signal on the first frequency domain resources in a first time window; in step S22, the user equipment U02 receives a first signaling; in step S23, the user equipment U02 receives a third signaling; in step S24, the user equipment U02 receives a second signaling.

In Embodiment 5, a center frequency of the first frequency domain resources is a first frequency; the first frequency domain resources includes X subcarrier(s); the X is a positive integer; a carrier to which the first frequency domain resources belongs is a first carrier; a frequency band to which the first carrier belongs is a first frequency band; a center frequency of the first carrier is a second frequency; an interval between the first frequency and the second frequency in a frequency domain is a first frequency interval; the first frequency interval is related to a subcarrier spacing of the X subcarrier(s); the first radio signal is used to determine at least one of a location of the first time window in a time domain, the first frequency; the first radio signal is broadcast; or the first radio signal is multicast; the first signaling is used to determine a feature ID of a transmitter of the first radio signal in the first carrier; the second signaling is used to determine a frequency interval other than the first frequency interval in the target frequency interval set; the third signaling is used to determine a second frequency offset.

In one embodiment, the first frequency interval belongs to the target frequency interval set; the target frequency interval set includes a positive integer number of frequency intervals, at least a first one of a subcarrier spacing of the X subcarrier(s), a frequency domain bandwidth of the first frequency domain resources, a location of the first frequency band in a frequency domain, a frequency domain bandwidth of the first carrier is used to determine the target frequency interval set out of Y frequency interval sets; the Y is a positive integer.

In one embodiment, a frequency interval between the first frequency and a lowest frequency of the first frequency band is equal to a sum of P times of first rasters and a second frequency offset; the P is a positive integer; the first raster is a predefined fixed frequency interval; or the first raster is determined by a location of the first frequency band in a frequency domain; the second frequency offset is configurable; or the second frequency offset is a predefined value that is less than or equal to a first threshold; the first threshold is a non-negative number; the first threshold is smaller than the first raster; the first threshold is fixed; or the first threshold is determined by at least one of a location of the first frequency band in a frequency domain, a subcarrier spacing of the X subcarrier(s).

In one embodiment, the first radio signal is generated by a feature sequence, and the feature sequence is one of a Zadoff-Chu sequence, a pseudo-random sequence.

In one embodiment, the first radio signal is a Primary Synchronization Signal (PSS).

In one embodiment, the first time window includes 1 OFDM symbol in the time domain.

In one embodiment, the first signaling is carried through at least a first one of a SSS (Secondary Synchronization Signal), a Primary Synchronization Signal (PSS).

In one embodiment, the feature ID is a Physical Cell ID (PCID).

In one embodiment, the second signaling is Radio Resource Control (RRC).

In one embodiment, the third signaling is transmitted through at least one of a Physical Broadcast Channel (PBCH) and a Secondary Synchronization Signal (SSS).

Embodiment 6

Figure 6:
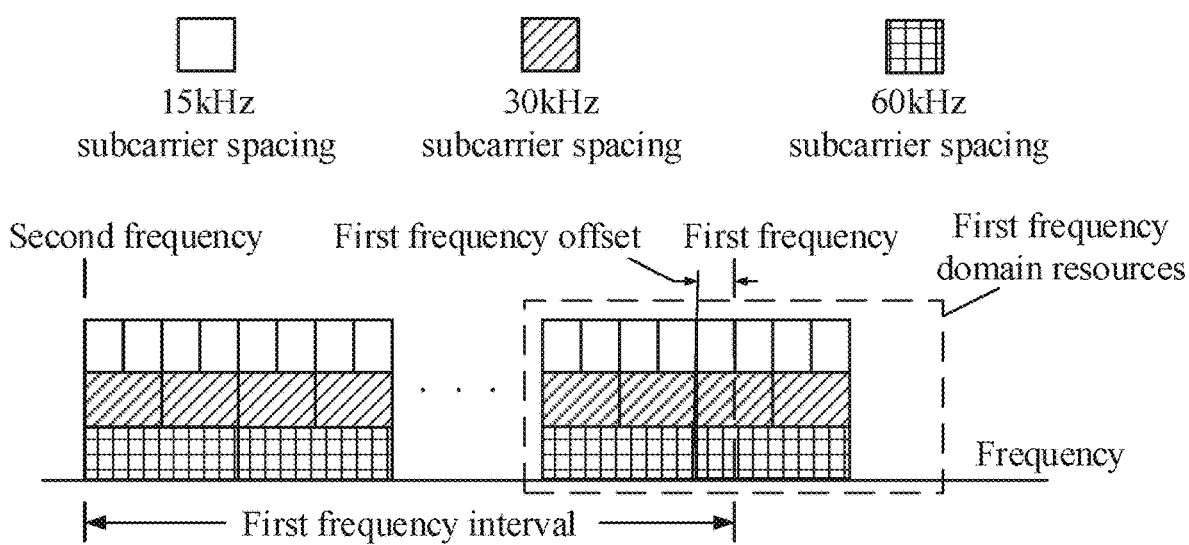
FIG. 6 shows a schematic diagram of a relationship between a first frequency and a second frequency according to one embodiment of the present disclosure.

Embodiment 6 illustrates a schematic diagram of a relationship between the first frequency and the second frequency, as shown in FIG. 6. In FIG. 6, the horizontal axis represents the frequency, and the unfilled rectangle represents the unit frequency interval when the subcarrier spacing is 15 kHz; the slash-filled rectangle represents the unit frequency interval when the subcarrier spacing is 30 kHz; the cross line filled rectangle represents the unit frequency interval when the subcarrier spacing is 60 kHz; the frequency domain resources corresponding to the unit frequency interval circled by the dotted line frame is the first frequency domain resources.

In Embodiment 6, a center frequency of the first frequency domain resources is a first frequency; the first frequency domain resources includes X subcarrier(s); the X is a positive integer; a carrier to which the first frequency domain resources belongs is a first carrier; a frequency band to which the first carrier belongs is a first frequency band; a center frequency of the first carrier is a second frequency; an interval between the first frequency and the second frequency in a frequency domain is a first frequency interval; the first frequency interval is related to a subcarrier spacing of the X subcarrier(s); a frequency domain width of the first carrier is equal to a sum of an even number of the unit frequency intervals; the first frequency interval is equal to a sum of non-negative integer times of the unit frequency intervals, a first frequency offset; or a frequency domain width of the first carrier is equal to a sum of an odd number of the unit frequency intervals; the first frequency interval is equal to a sum of non-negative integer times of the unit frequency interval, half of the unit frequency interval, the first frequency offsets; the unit frequency interval is equal to 12 times of the subcarrier spacing of the X subcarrier(s); a subcarrier spacing of each subcarrier in the X subcarrier(s) is equal to the subcarrier spacing of the X subcarrier(s); the first frequency offset is a non-negative number that is less than half of the unit frequency interval; the first frequency offset is configurable; or the first frequency offset is a predefined fixed value.

In one embodiment, the first frequency domain resources is contiguous in the frequency domain.

In one embodiment, the subcarrier spacing of the X subcarrier(s) are equal.

In one embodiment, the first carrier contains two subcarriers with unequal subcarrier spacing.

In one embodiment, the first carrier includes a transmission frequency domain resources and a protection frequency domain resources.

In one embodiment, the first frequency band is a pair of continuous spectrum resources.

In one embodiment, the first frequency band is a single continuous spectrum resource.

In one embodiment, the first frequency interval is related to the subcarrier spacing of the X subcarrier(s), which means that the first frequency interval is linearly related to the subcarrier spacing of the X subcarrier(s).

In one embodiment, the unit frequency interval is equal to a width of a Physical Resource Block (PRB) in the frequency domain.

In one embodiment, the first frequency offset is a frequency interval between the first frequency and a third frequency, the third frequency is a center frequency of a second frequency domain resources, and the second frequency domain resources is a consecutive PRB block set occupied by the first wireless signal.

In one embodiment, the first frequency offset is equal to zero.

In one embodiment, the first frequency offset is equal to half of the subcarrier spacing of the X subcarrier(s).

In one embodiment, a subcarrier spacing of the X subcarrier(s) is one of 3.75 kHz, 7.5 kHz, 15 kHz, 30 kHz, 60 kHz, 120 kHz, 240 kHz, and 480 kHz.

Embodiment 7

Figure 7:
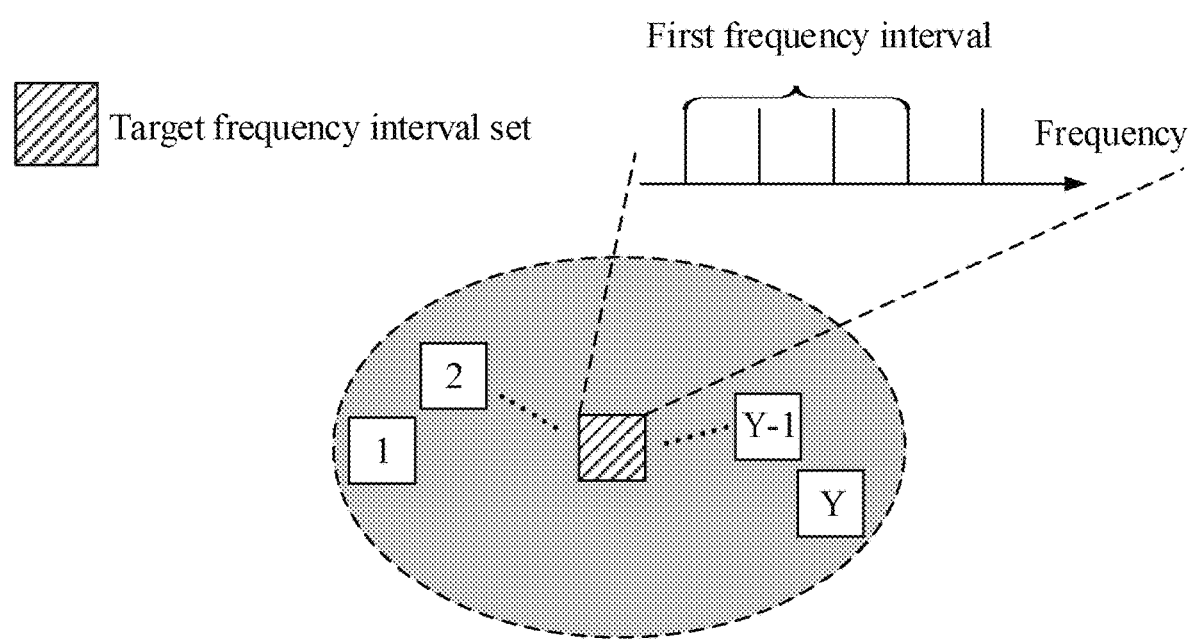
FIG. 7 shows a schematic diagram of a relationship between a first frequency interval and a target frequency interval set according to one embodiment of the present disclosure.

Embodiment 7 illustrates a schematic diagram of a first frequency domain resources, as shown in FIG. 7. In FIG. 7, each rectangle represents a frequency interval set out of Y frequency interval sets; a slash filled rectangle represents a target frequency interval set, and an upper right corner is an explanatory diagram of a combination of target frequency intervals, wherein the horizontal axis represents frequency, each vertical line represents the frequency interval of the combination of the target frequency interval to the starting frequency.

In Embodiment 7, the first frequency interval belongs to a target frequency interval set, and the target frequency interval set includes a positive integer number of frequency intervals, the target frequency interval set belongs to one of Y frequency interval sets, and the Y is positive Integer.

In one embodiment, the target frequency interval set includes only the first frequency interval.

In one embodiment, the frequency intervals in the target frequency interval set are all different.

In one embodiment, the frequency interval set out of the Y frequency interval sets is all the same.

In one embodiment, there are two different frequency interval set out of the Y frequency interval set.

Embodiment 8

Figure 8:
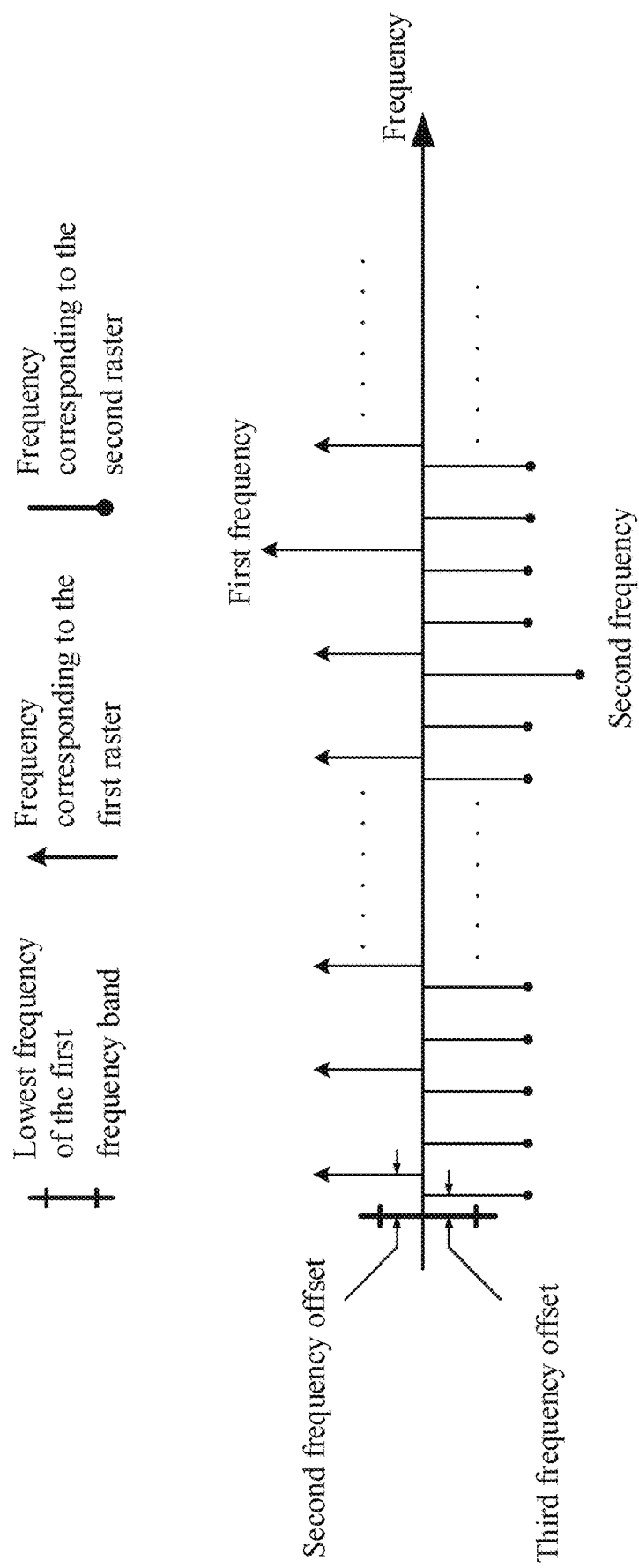
FIG. 8 shows a structural block diagram of a relationship between a first frequency and first raster, a second frequency and second raster according to one embodiment of the present disclosure.

Embodiment 8 illustrates a schematic diagram of a relationship between a first frequency and a first raster, and a second frequency and a second raster, as shown in FIG. 8. In FIG. 8, the horizontal axis represents the frequency; each vertical line with arrow represents that the frequency is the first raster interval; each vertical line with dot represents that the frequency is the second raster interval; the vertical line with cross at two ends represent the lowest frequency of the first frequency band; the elongated vertical line with arrow represents the first frequency; the elongated vertical line with dot the second frequency.

In embodiment 8, the frequency interval between the first frequency and a lowest frequency of the first frequency band is equal to a sum of P times of first rasters and a second frequency offset; the P is a positive integer; the first raster is a predefined fixed frequency interval; or the first raster is determined by a location of the first frequency band in a frequency domain; the second frequency offset is configurable; or the second frequency offset is a predefined value that is less than or equal to a first threshold; the first threshold is a non-negative number; the first threshold is smaller than the first raster; the first threshold is fixed; or the first threshold is determined by at least one of a location of the first frequency band in a frequency domain, a subcarrier spacing of the X subcarrier(s). the frequency interval between the second frequency and a lowest frequency of the first frequency band is equal to a sum of Q times of second rasters and a third frequency offset; the Q is a positive integer; the second raster is a predefined fixed frequency interval; or the second raster is determined by a location of the first frequency band in a frequency domain; the third frequency offset is a predefined value that is less than or equal to a second threshold; the second threshold is a non-negative number; the second threshold is fixed; or the second threshold is determined by at least one of a location of the first frequency band in a frequency domain, a subcarrier spacing of the X subcarrier(s).

In one embodiment, the first raster is equal to a positive integer number of 100 kHz.

In one embodiment, the first raster is determined by the location of the first frequency band in the frequency domain through a given mapping relationship.

In one embodiment, the second frequency offset is equal to zero.

In one embodiment, the second frequency offset is one of K frequency offsets, the K is a positive integer, and each of the K frequency offsets is less than or equal to the first threshold.

In one embodiment, the first threshold is determined by at least one of a location of the first frequency band in the frequency domain, a subcarrier spacing of the X subcarrier(s) through a given mapping relationship.

In one embodiment, the first threshold is equal to zero.

In one embodiment, the unit of the first threshold is Hz.

In one embodiment, the unit of the first threshold is PPM.

In one embodiment, the second raster is equal to 100 kHz

In one embodiment, the second raster is determined by the location of the first frequency band in the frequency domain through a given mapping relationship.

In one embodiment, the third frequency offset is zero.

In one embodiment, the third frequency offset is greater than zero.

In one embodiment, the third frequency offset is one of L frequency offsets, the L is a positive integer, and each of the L frequency offsets is less than or equal to the first threshold.

In one embodiment, the second threshold is determined by at least one of a location of the first frequency band in the frequency domain, a subcarrier spacing of the X subcarrier(s) through a given mapping relationship.

In one embodiment, the second threshold is equal to zero.

In one embodiment, the unit of the second threshold is Hz.

In one embodiment, the unit of the second threshold is PPM.

Embodiment 9

Figure 9:
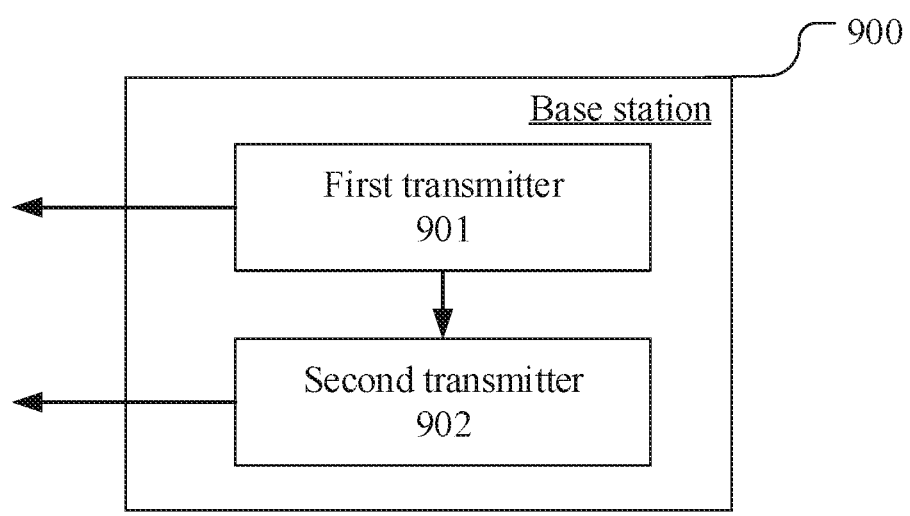
FIG. 9 shows a structural block diagram of a processing device in a base station according to one embodiment of the present disclosure.

Embodiment 9 illustrates a structural block diagram of a processing device in a base station; as shown in FIG. 9. In FIG. 9, the base station 900 is primarily comprised of a first transmitter 901 and a second transmitter 902; The first transmitter 901 includes a transmitter/receiver 416 (including an antenna 420) and a transmitting processor 415 in Embodiment 4; the second transmitter 902 includes the transmitter/receiver 416 (including antenna 420), transmitting processor 415 and controller/processor 440 in Embodiment 4.

In Embodiment 9, the first transmitter 901 is configured to transmit a first radio signal on a first frequency domain resources in a first time window; the second transmitter 902 is configured to transmit a first signaling. The center frequency of the first frequency domain resources is a first frequency; the first frequency domain resources includes X subcarrier(s); the X is a positive integer; the carrier to which the first frequency domain resources belongs is the first carrier; the frequency band to which the first carrier belongs is the first frequency band; the center frequency of the first carrier is the second frequency; the interval between the first frequency and the second frequency in the frequency domain is the first frequency interval; the first frequency interval is related to the subcarrier spacing of the X subcarrier(s). The first radio signal is used to determine at least one of the location of the first time window in the time domain, the first frequency. The first radio signal is broadcast; or the first radio signal is multicast. The first signaling is used to determine a feature ID of a transmitter of the first radio signal in the first carrier. The second transmitter 902 is further configured to transmit a second signaling and a third signaling.

In one embodiment, the first frequency interval belongs to a target frequency interval set, where the target frequency interval set includes a positive integer number of frequency intervals, at least a first one of a subcarrier spacing of the X subcarrier(s), a frequency domain bandwidth of the first frequency domain resources, a location of the first frequency band in a frequency domain, and a frequency domain bandwidth of the first carrier is used to determine the target frequency interval set out of Y frequency interval sets; the Y is a positive integer.

In one embodiment, the second signaling is used to determine a frequency interval other than the first frequency interval in the target frequency interval set.

In one embodiment, each frequency interval in the target frequency interval set is equal to a sum of a non-negative integer of unit frequency intervals, a first frequency offset; or each frequency interval in the target frequency interval set is equal to a sum of a non-negative integer times of the unit frequency intervals, half of the unit frequency interval, the first frequency offset; the unit frequency interval is equal to 12 times of the first subcarrier interval, a subcarrier spacing of each subcarrier in the X subcarrier(s) is equal to a subcarrier spacing of the X subcarrier(s); the first frequency offset is a non-negative number that is less than half of the unit frequency interval; the first frequency offset is configurable; or the first frequency offset is a predefined fixed value.

In one embodiment, a frequency interval between the first frequency and a lowest frequency of the first frequency band is equal to a sum of P times of first rasters and a second frequency offset; the P is a positive integer; the first raster is a predefined fixed frequency interval; or the first raster is determined by a location of the first frequency band in a frequency domain; the second frequency offset is configurable; or the second frequency offset is a predefined value less than or equal to a first threshold; the first threshold is a non-negative number; the first threshold is smaller than the first raster; the first threshold is fixed; or the first threshold is determined by at least one of a location of the first frequency band in the frequency domain, a subcarrier spacing of the X subcarrier(s).

In one embodiment, the third signaling is used to determine the second frequency offset.

In one embodiment, a frequency interval between the second frequency and a lowest frequency of the first frequency band is equal to a sum of Q times of second rasters and a third frequency offset; the Q is a positive integer; the second raster is a predefined fixed frequency interval; or the second raster is determined by a location of the first frequency band in a frequency domain; the third frequency offset is a predefined value less than or equal to a second threshold; the second threshold is a non-negative number; the second threshold is fixed; or the second threshold is determined by at least one of a location of the first frequency band in a frequency domain, a subcarrier spacing of the X subcarrier(s).

Embodiment 10

Figure 10:
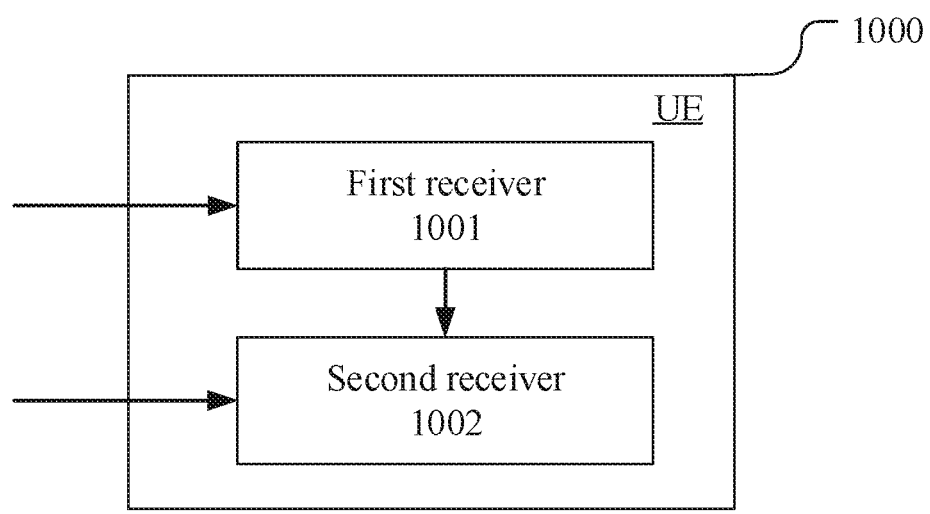
FIG. 10 shows a structural block diagram of a processing device in a user equipment (UE) according to one embodiment of the present disclosure.

Embodiment 10 illustrates a structural block diagram of a processing device in a user equipment, as shown in FIG. 10. In FIG. 10, the user equipment 1000 is mainly composed of a first receiver 1001 and a second receiver 1002. The first receiver 1001 includes the transmitter/receiver 456 (including the antenna 460) and the receiving processor 452 in Embodiment IV; the second receiver 1002 includes the transmitter/receiver 456 (including the antenna 460), receiving processor 452 and controller/processor 490 in Embodiment 4.

In the embodiment 10, the first receiver 1001 is configured to receive a first radio signal on a first frequency domain resources in a first time window, and the second receiver 1002 is configured to receive the first signaling. The center frequency of the first frequency domain resources is a first frequency; the first frequency domain resources includes X subcarrier(s); the X is a positive integer; d the carrier to which the first frequency domain resources belongs is the first carrier; the frequency band to which the first carrier belongs is the first frequency band; the center frequency of the first carrier is the second frequency; the interval between the first frequency and the second frequency in the frequency domain is the first frequency interval; the first frequency interval is related to the subcarrier spacing of the X subcarrier(s). The first radio signal is used to determine at least one of the location of the first time window in the time domain, the first frequency. The first radio signal is broadcast; or the first radio signal is multicast. The first signaling is used to determine a feature ID of a transmitter of the first radio signal in the first carrier. The second receiver 1002 is further used to receive the second signaling and the third signaling.

In one embodiment, the first frequency interval belongs to a target frequency interval set, where the target frequency interval set includes a positive integer number of frequency intervals, at least a first one of a subcarrier spacing of the X subcarrier(s), a frequency domain bandwidth of the first frequency domain resources, a location of the first frequency band in a frequency domain, and a frequency domain bandwidth of the first carrier is used to determine the target frequency interval set out of Y frequency interval sets; the Y is a positive integer.

In one embodiment, the second signaling is used to determine a frequency interval other than the first frequency interval in the target frequency interval set.

In one embodiment, each frequency interval in the target frequency interval set is equal to a sum of a non-negative integer times of unit frequency intervals, a first frequency offset; or each frequency interval in the target frequency interval set is equal to a sum of a non-negative integer times of the unit frequency intervals, half of the unit frequency interval, the first frequency offset; the unit frequency interval is equal to 12 times of the first subcarrier interval, a subcarrier spacing of each subcarrier in the X subcarrier(s) is equal to a subcarrier spacing of the X subcarrier(s); the first frequency offset is a non-negative number that is less than half of the unit frequency interval; the first frequency offset is configurable; or the first frequency offset is a predefined fixed value.

In one embodiment, a frequency interval between the first frequency and a lowest frequency of the first frequency band is equal to a sum of P times of first rasters and a second frequency offset; the P is a positive integer; the first raster is a predefined fixed frequency interval; or the first raster is determined by a location of the first frequency band in a frequency domain; the second frequency offset is configurable; or the second frequency offset is a predefined value less than or equal to a first threshold; the first threshold is a non-negative number; the first threshold is smaller than the first raster; the first threshold is fixed; or the first threshold is determined by at least one of a location of the first frequency band in the frequency domain, a subcarrier spacing of the X subcarrier(s).

In one embodiment, the third signaling is used to determine the second frequency offset.

In one embodiment, a frequency interval between the second frequency and a lowest frequency of the first frequency band is equal to a sum of Q times of second rasters and a third frequency offset; the Q is a positive integer; the second raster is a predefined fixed frequency interval; or the second raster is determined by a location of the first frequency band in a frequency domain; the third frequency offset is a predefined value less than or equal to a second threshold; the second threshold is a non-negative number; the second threshold is fixed; or the second threshold is determined by at least one of a location of the first frequency band in a frequency domain, a subcarrier spacing of the X subcarrier(s).

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be implemented in the form of hardware, or in the form of software function modules. The present disclosure is not limited to any combination of hardware and software in specific forms. The UE and terminal in the present disclosure include but are not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things (IOT), RFID terminals, NB-IOT terminals, Machine Type Communication (MTC) terminals, enhanced MTC (eMTC) terminals, data cards, low-cost mobile phones, low-cost tablet computers, etc. The base station in the present disclosure includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claims is:

1. A method for synchronization in a base station, comprising:

transmitting a first radio signal on first frequency-domain resources in a first time window; and transmitting a first signaling;

wherein a center frequency of the first frequency-domain resources is a first frequency; the first frequency-domain resources include X subcarrier(s); the X is a positive integer; a carrier to which the first frequency-domain resources belong is a first carrier; a frequency band to which the first carrier belongs is a first frequency band, a center frequency of the first carrier is a second frequency; an interval between the first frequency and the second frequency in frequency domain is a first frequency interval; the first frequency interval is related to a subcarrier spacing of the X subcarrier(s); the first radio signal is used to determine at least one of a location of the first time window in time domain or the first frequency; the first radio signal is broadcast; or the first radio signal is multicast; the first signaling is used to determine a feature ID of a transmitter of the first radio signal in the first carrier; the first frequency interval belongs to a target frequency interval set; the target frequency interval set includes a positive integer number of frequency interval(s); a subcarrier spacing of the X subcarrier(s) and a location of the first frequency band in frequency domain are used to determine the target frequency interval set out of Y frequency interval sets; and the Y is a positive integer; the first radio signal is a Primary Synchronization Signal (PSS), the first signaling is carried by Secondary Synchronization Signal (SSS); the first frequency band is a Time Division Duplexing (TDD) frequency band.

2. The method according to claim 1, wherein each frequency interval in the target frequency interval set is equal to a sum of a non-negative integer times of a unit frequency interval, a first frequency offset; or each frequency interval in the target frequency interval set is equal to a sum of a non-negative integer times of the unit frequency interval, half of the unit frequency interval, the first frequency offset; the unit frequency interval is equal to 12 times of a first subcarrier spacing; a subcarrier spacing of each subcarrier in the X subcarrier(s) is equal to the first subcarrier spacing; the first frequency offset is a non-negative number that is less than half of the unit frequency interval; the first frequency offset is configurable; or the first frequency offset is a predefined fixed value; the unit frequency interval is equal to a width of a Physical Resource Block (PRB) in frequency domain.

3. The method according to claim 1, wherein a frequency interval between the first frequency and a lowest frequency of the first frequency band is equal to a sum of P times of a first raster and a second frequency offset; the P is a positive integer; the first raster is determined by a location of the first frequency band in frequency domain; the second frequency offset is equal to a first threshold; the first threshold is a non-negative number; the first threshold is smaller than the first raster; the first threshold is determined by at least one of a location of the first frequency band in frequency domain, or a subcarrier spacing of the X subcarrier(s); the first raster is equal to a positive integer number of 100 kHz.

4. The method according to claim 1, wherein a frequency interval between the second frequency and a lowest frequency of the first frequency band is equal to a sum of Q times of a second raster and a third frequency offset; the Q is a positive integer; the second raster is determined by a location of the first frequency band in frequency domain; the third frequency offset is equal to a second threshold; the second threshold is a non-negative number; the second threshold is determined by at least one of a location of the first frequency band in frequency domain, or a subcarrier spacing of the X subcarrier(s).

5. The method according to claim 1, further comprising:
transmitting a second signaling;
wherein the second signaling is used to determine a frequency interval other than the first frequency interval in the target frequency interval set, the second signaling is carried by a Physical Broadcast Channel (PBCH).

6. A method for synchronization in a user equipment, comprising:
receiving a first radio signal on first frequency-domain resources in a first time window; and
receiving a first signaling;
wherein a center frequency of the first frequency-domain resources is a first frequency; the first frequency-domain resources include X subcarrier(s); the X is a positive integer; a carrier to which the first frequency-domain resources belong is a first carrier; a frequency band to which the first carrier belongs is a first frequency band; a center frequency of the first carrier is a second frequency; an interval between the first frequency and the second frequency in frequency domain is a first frequency interval; the first frequency interval is related to a subcarrier spacing of the X subcarrier(s); the first radio signal is used to determine at least one of a location of the first time window in time domain, or the first frequency; the first radio signal is broadcast; or the first radio signal is multicast; the first signaling is used to determine a feature ID of a transmitter of the first radio signal in the first carrier; the first frequency interval belongs to a target frequency interval set; the target frequency interval set includes a positive integer number of frequency interval(s); a subcarrier spacing of the X subcarrier(s) and a location of the first frequency band in frequency domain are used to determine the target frequency interval set out of Y frequency interval sets; and the Y is a positive integer; the first radio signal is a Primary Synchronization Signal (PSS), the first signaling is carried by Secondary Synchronization Signal (SSS); the first frequency band is a Time Division Duplexing (TDD) frequency band.

7. The method according to claim 6, wherein each frequency interval in the target frequency interval set is equal to a sum of a non-negative integer times of a unit frequency interval, a first frequency offset; or each frequency interval in the target frequency interval set is equal to a sum of a non-negative integer times of the unit frequency interval, half of the unit frequency interval, the first frequency offset; the unit frequency interval is equal to 12 times of a first subcarrier spacing, a subcarrier spacing of each subcarrier in the X subcarrier(s) is equal to the first subcarrier spacing; the first frequency offset is a non-negative number that is less than half of the unit frequency interval; the first frequency offset is configurable; or the first frequency offset is a predefined fixed value; the unit frequency interval is equal to a width of a Physical Resource Block (PRB) in frequency domain.

8. The method according to claim 6, wherein a frequency interval between the first frequency and a lowest frequency of the first frequency band is equal to a sum of P times of a first raster and a second frequency offset; the P is a positive integer; the first raster is determined by a location of the first frequency band in frequency domain; the second frequency offset is equal to a first threshold; the first threshold is a non-negative number; the first threshold is smaller than the first raster; the first threshold is determined by at least one of a location of the first frequency band in frequency domain, or a subcarrier spacing of the X subcarrier(s); the first raster is equal to a positive integer number of 100 kHz.

9. The method according to claim 6, wherein a frequency interval between the second frequency and a lowest frequency of the first frequency band is equal to a sum of Q times of a second raster and a third frequency offset; the Q is a positive integer; the second raster is determined by a location of the first frequency band in frequency domain; the third frequency offset is equal to a second threshold; the second threshold is a non-negative number; the second threshold is determined by at least one of a location of the first frequency band in frequency domain, or a subcarrier spacing of the X subcarrier(s).

10. The method according to claim 6, further comprising:
receiving a second signaling;
wherein the second signaling is used to determine a frequency interval other than the first frequency interval in the target frequency interval set, the second signaling is carried by a Physical Broadcast Channel (PBCH).

11. A base station used for synchronization, comprising:
a first transmitter, transmitting a first radio signal on first frequency-domain resources in a first time window; and
a second transmitter, transmitting a first signaling;
wherein a center frequency of the first frequency-domain resources is a first frequency; the first frequency-domain resources includes X subcarrier(s); the X is a positive integer; a carrier to which the first frequency-domain resources belong is a first carrier; a frequency band to which the first carrier belongs is a first frequency band; a center frequency of the first carrier is a second frequency; an interval between the first frequency and the second frequency in frequency domain is a first frequency interval; the first frequency interval is related to a subcarrier spacing of the X subcarrier(s); the first radio signal is used to determine at least one of a location of the first time window in time domain, or the first frequency; the first radio signal is broadcast; or the first radio signal is multicast; the first signaling is used to determine a feature ID of a transmitter of the first radio signal in the first carrier; the first frequency interval belongs to a target frequency interval set; the target frequency interval set includes a positive integer number of frequency interval(s); a subcarrier spacing of the X subcarrier(s) and a location of the first frequency band in frequency domain are used to determine the target frequency interval set out of Y frequency interval sets; and the Y is a positive integer; the first radio signal is a Primary Synchronization Signal (PSS), the first signaling is carried by Secondary Synchronization Signal (SSS); the first frequency band is a Time Division Duplexing (TDD) frequency band.

12. The base station according to claim 11, wherein each frequency interval in the target frequency interval set is equal to a sum of a non-negative integer times of a unit frequency interval and a first frequency offset; or each frequency interval in the target frequency interval set is equal to a sum of a non-negative integer times of the unit frequency interval, half of the unit frequency interval and the first frequency offset; the unit frequency interval is equal to 12 times of a first subcarrier spacing; a subcarrier spacing of each subcarrier in the X subcarrier(s) is equal to the first subcarrier spacing; the first frequency offset is a non-negative number that is less than a half of the unit frequency interval; the first frequency offset is configurable; or the first frequency offset is a predefined fixed value; the unit frequency interval is equal to a width of a Physical Resource Block (PRB) in frequency domain.

13. The base station according to claim 11, wherein a frequency interval between the first frequency and a lowest frequency of the first frequency band is equal to a sum of P times of a first raster and a second frequency offset; the P is a positive integer; the first raster is determined by a location of the first frequency band in frequency domain; the second frequency offset is equal to a first threshold; the first threshold is a non-negative number; the first threshold is smaller than the first raster; the first threshold is determined by at least one of a location of the first frequency band in frequency domain, or a subcarrier spacing of the X subcarrier(s); the first raster is equal to a positive integer number of 100 kHz.

14. The base station according to claim 11, wherein a frequency interval between the second frequency and a lowest frequency of the first frequency band is equal to a sum of Q times of a second raster and a third frequency offset; the Q is a positive integer; the second raster is determined by a location of the first frequency band in frequency domain; the third frequency offset is equal to a second threshold; the second threshold is a non-negative number; the second threshold is determined by at least one of a location of the first frequency band in frequency domain, or a subcarrier spacing of the X subcarrier(s).

15. The base station according to claim 11, wherein the second transmitter transmits a second signaling; the second signaling is used to determine a frequency interval other than the first frequency interval in the target frequency interval set, the second signaling is carried by a Physical Broadcast Channel (PBCH).

16. A user equipment (UE) used for synchronization, comprising:
a first receiver, receiving a first radio signal on first frequency-domain resources in a first time window; and
a second receiver, receiving a first signaling;
wherein a center frequency of the first frequency-domain resources is a first frequency; the first frequency-domain resources include X subcarrier(s); the X is a positive integer; a carrier to which the first frequency-domain resources belong is a first carrier; a frequency band to which the first carrier belongs is a first frequency band; a center frequency of the first carrier is a second frequency; an interval between the first frequency and the second frequency in frequency domain is a first frequency interval; the first frequency interval is related to a subcarrier spacing of the X subcarrier(s); the first radio signal is used to determine at least one of a location of the first time window in time domain, the first frequency; the first radio signal is broadcast; or the first radio signal is multicast; the first signaling is used to determine a feature ID of a transmitter of the first radio signal in the first carrier; the first frequency interval belongs to a target frequency interval set; the target frequency interval set includes a positive integer number of frequency interval(s); a subcarrier spacing of the X subcarrier(s) and a location of the first frequency band in frequency domain are used to determine the target frequency interval set out of Y frequency interval sets; and the Y is a positive integer; the first radio signal is a Primary Synchronization Signal (PSS), the first signaling is carried by Secondary Synchronization Signal (SSS); the first frequency band is a Time Division Duplexing (TDD) frequency band.

17. The user equipment of claim 16, wherein each frequency interval in the target frequency interval set is equal to a sum of a non-negative integer times of a unit frequency interval, a first frequency offset; or each frequency interval in the target frequency interval set is equal to a sum of a non-negative integer times of the unit frequency interval, half of the unit frequency interval, the first frequency offset; the unit frequency interval is equal to 12 times of a first subcarrier spacing; a subcarrier spacing of each subcarrier in the X subcarrier(s) is equal to the first subcarrier spacing; the first frequency offset is a non-negative number that is less than a half of the unit frequency interval; the first frequency offset is configurable; or the first frequency offset is a predefined fixed value; the unit frequency interval is equal to a width of a Physical Resource Block (PRB) in frequency domain.

18. The user equipment of claim 16, wherein a frequency interval between the first frequency and a lowest frequency of the first frequency band is equal to a sum of P times of a first raster and a second frequency offset; the P is a positive integer; the first raster is determined by a location of the first frequency band in frequency domain; the second frequency offset is equal to a first threshold; the first threshold is a non-negative number; the first threshold is smaller than the first raster; the first threshold is determined by at least one of a location of the first frequency band in frequency domain, a subcarrier spacing of the X subcarrier(s); the first raster is equal to a positive integer number of 100 kHz.

19. The user equipment of claim 16, wherein a frequency interval between the second frequency and a lowest frequency of the first frequency band is equal to a sum of Q times of a second raster and the third frequency offset; the Q is a positive integer; the second raster is determined by a location of the first frequency band in frequency domain; the third frequency offset is equal to a second threshold; the second threshold is a non-negative number; the second threshold is determined by at least one of a location of the first frequency band in frequency domain, or a subcarrier spacing of the X subcarrier(s).

20. The user equipment according to claim 16, wherein the second receiver receives a second signaling; the second signaling is used to determine a frequency interval other than the first frequency interval in the target frequency interval set, the second signaling is carried by a Physical Broadcast Channel (PBCH).

* * * * *